US012348346B2

(12) United States Patent
Saggar et al.

(10) Patent No.: US 12,348,346 B2
(45) Date of Patent: Jul. 1, 2025

(54) FLEXIBLE GUARD LENGTH INTERVAL

(71) Applicant: QUALCOMM Incorporated, San Diego, CA (US)

(72) Inventors: Hemant Saggar, San Diego, CA (US); Iyab Issam Sakhnini, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 18/169,186

(22) Filed: Feb. 14, 2023

(65) Prior Publication Data

US 2024/0275652 A1    Aug. 15, 2024

(51) Int. Cl.
*H04L 27/26*    (2006.01)
(52) U.S. Cl.
CPC .............................. *H04L 27/2605* (2013.01)
(58) Field of Classification Search
CPC ............. H04L 27/2605; H04L 27/2646; H04L 1/0003; H04L 25/0216; H04L 1/0009; H04L 27/26025; H04L 27/2607; H04B 1/719; H04B 7/0417; H04B 7/0621
See application file for complete search history.

(56) References Cited

U.S. PATENT DOCUMENTS

| | | | | |
|---|---|---|---|---|
| 11,855,818 B1* | 12/2023 | Sun | ...................... | H04L 27/2646 |
| 2009/0147867 A1* | 6/2009 | Okamoto | ............ | H04L 27/2605 |
| | | | | 375/260 |
| 2011/0038430 A1* | 2/2011 | Yoshimoto | ............ | H04L 5/0055 |
| | | | | 375/259 |
| 2012/0281551 A1* | 11/2012 | Alanara | .............. | H04L 27/2607 |
| | | | | 370/252 |
| 2013/0315321 A1* | 11/2013 | Rajagopal | ............ | H04B 7/0695 |
| | | | | 375/260 |

(Continued)

FOREIGN PATENT DOCUMENTS

EP      1921785 A1    5/2008

OTHER PUBLICATIONS

International Search Report and Written Opinion—PCT/US2024/015717—ISA/EPO—Jun. 12, 2024.

*Primary Examiner* — Sophia Vlahos
(74) *Attorney, Agent, or Firm* — Paul M. McAdams; Polsinelli LLP

(57) ABSTRACT

A method for wireless communication at a first network entity and related apparatus are provided. In the method, the first network entity communicates, with a second network entity, information indicative of a guard interval length. The information indicative of the guard interval length is based on transmission information. The first network entity further communicates, with the second network entity, a transmission including one or more symbols. Each symbol of the one or more symbols includes a particular guard interval based on the information indicative of the guard interval length. The method enables the GI length to be flexibly configured depending on various waveforms or channel parameters and characteristics of the transmission. The method enables transmission resources to be fully utilized according to actual operating conditions. Thus, it improves the efficiency and flexibility of wireless communication.

30 Claims, 17 Drawing Sheets

(56) References Cited

U.S. PATENT DOCUMENTS

| | | | |
|---|---|---|---|
| 2014/0192847 A1* | 7/2014 | Afkhami | H04B 3/542 |
| | | | 375/340 |
| 2015/0327217 A1* | 11/2015 | Aboul-Magd | H04L 5/005 |
| | | | 370/329 |
| 2016/0066321 A1* | 3/2016 | Yu | H04L 27/26025 |
| | | | 370/329 |
| 2017/0331658 A1* | 11/2017 | Chen | H04W 72/1263 |
| 2018/0324840 A1* | 11/2018 | Kim | H04L 27/26 |
| 2019/0020516 A1 | 1/2019 | Wang et al. | |
| 2019/0132829 A1 | 5/2019 | Bhattad et al. | |
| 2019/0159220 A1* | 5/2019 | Elsherif | H04W 72/12 |
| 2021/0243055 A1 | 8/2021 | Matsuda et al. | |

* cited by examiner

FLEXIBLE GUARD LENGTH INTERVAL

TECHNICAL FIELD

The present disclosure relates generally to communication systems, and more particularly, to wireless communication with flexible guard interval length in a symbol based on other waveform parameters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first network entity. The apparatus may include memory and at least one processor coupled to the memory. The at least one processor may be configured to communicate, with a second network entity, information indicative of a guard interval length. The information indicative of the guard interval length may be based on transmission information. The at least one processor may be further configured to communicate, with the second network entity, a transmission including one or more symbols. Each symbol of the one or more symbols may include a particular guard interval based on the information indicative of the guard interval length.

For ease of description and without losing the generality, in some examples, a user equipment (UE) may be used as an example first network entity, and a base station may be used as an example second network entity in the description in connection with the method, the computer-readable medium, and the apparatus provided for wireless communication. However, the example first network entity and the example second network entity are not intended to be limiting. In some aspects, the first network entity may be a base station, and the second network entity may be a UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
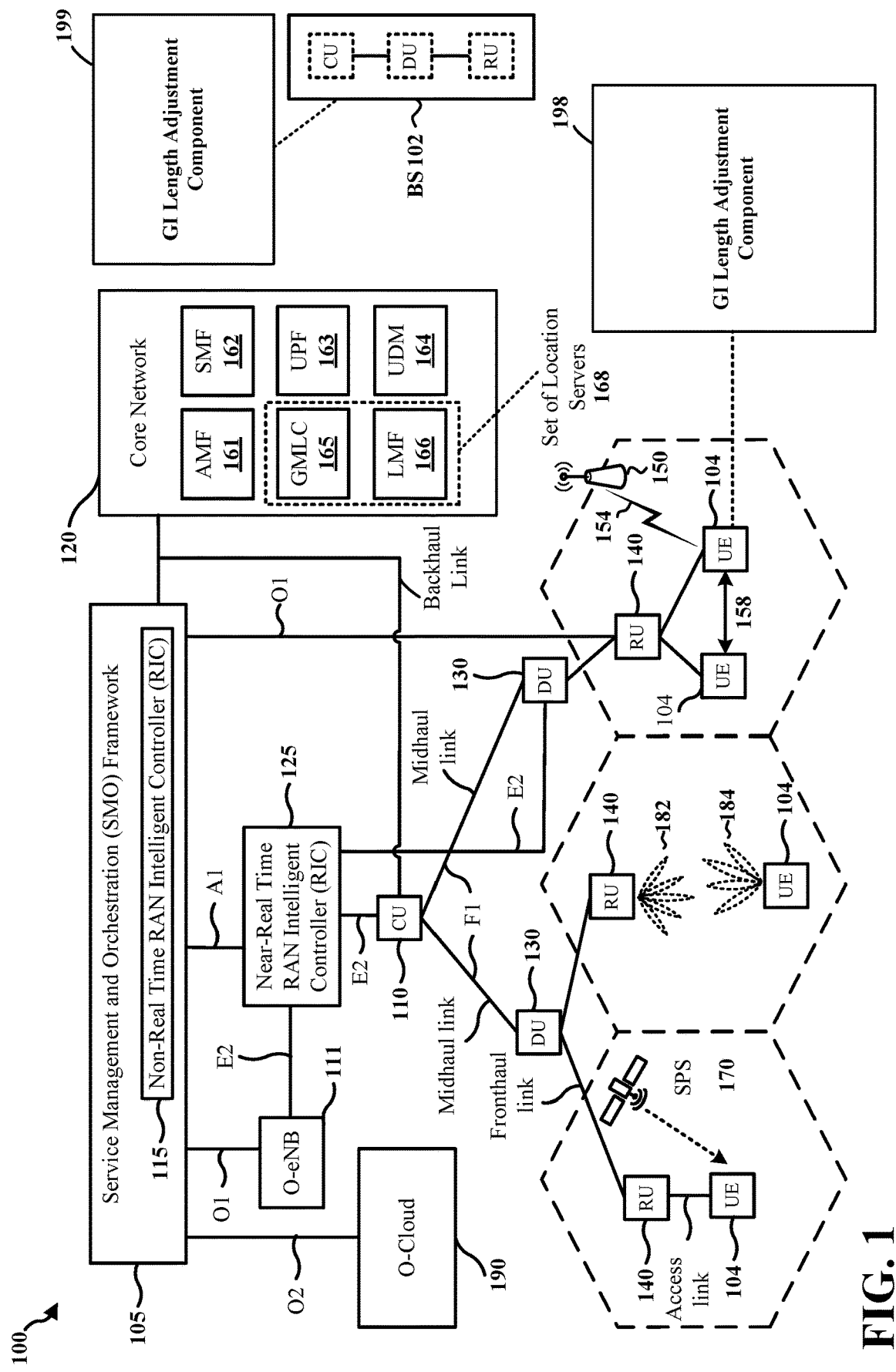
FIG. 1 is a diagram illustrating an example of a wireless communication system and an access network.

Various aspects relate generally to communication systems. Some aspects more specifically relate to wireless communication with flexible guard interval length in a symbol based on other waveform parameters. In some examples, a UE may communicate, with a network entity, information indicative of a guard interval length. The information indicative of the guard interval length may be based on transmission information. The UE may further communicate, with the network entity, a transmission including one or more symbols. Each symbol of the one or more symbols may include a particular guard interval based on the information indicative of the guard interval length.

Particular aspects of the subject matter described in this disclosure can be implemented to realize one or more of the following potential advantages. In some examples, by communicating information indicative of a guard interval length, the described techniques can be used to enable the GI length to be flexibly configured depending on various waveforms or channel parameters and characteristics of the transmission. Further, since the GI length may be configured based on various measurements, such as the block error rate (BLER), the signal-to-noise ratio (SNR), the quality metric, the signal-to-interference and noise ratio (SINR), the error vector magnitude (EVM), or the throughput, the described technique enables transmission resources to be fully utilized according to actual operating conditions. Thus, it improves the efficiency and flexibility and reduce the overhead of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a GI length adjustment component 198. The GI length adjustment component 198 may be configured to communicate, with a network entity, information indicative of a guard interval length, where the information indicative of the guard interval length is based on transmission information; and communicate, with the network entity, a transmission including one or more symbols, where each symbol of the one or more symbols includes a particular guard interval based on the information indicative of the guard interval length. In certain aspects, the base station 102 may include a GI length adjustment component 199. The GI length adjustment component 199 may be configured to communicate, with a UE, information indicative of a guard interval length, where the information indicative of the guard interval length is based on transmission information; and communicate, with the UE, a transmission including one or more symbols, where each symbol of the one or more symbols includes a particular guard interval based on the information indicative of the guard interval length. Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
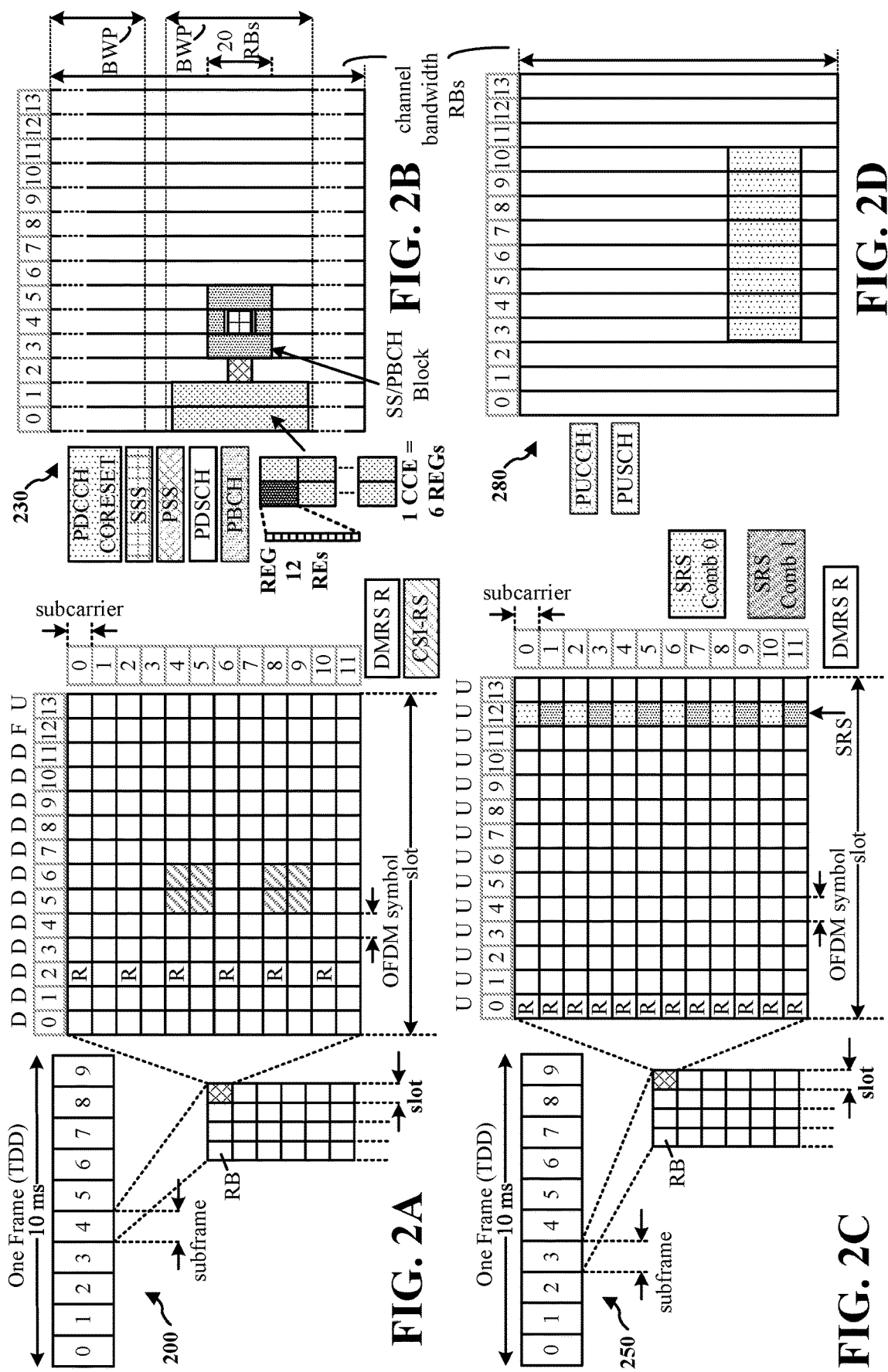
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depending on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
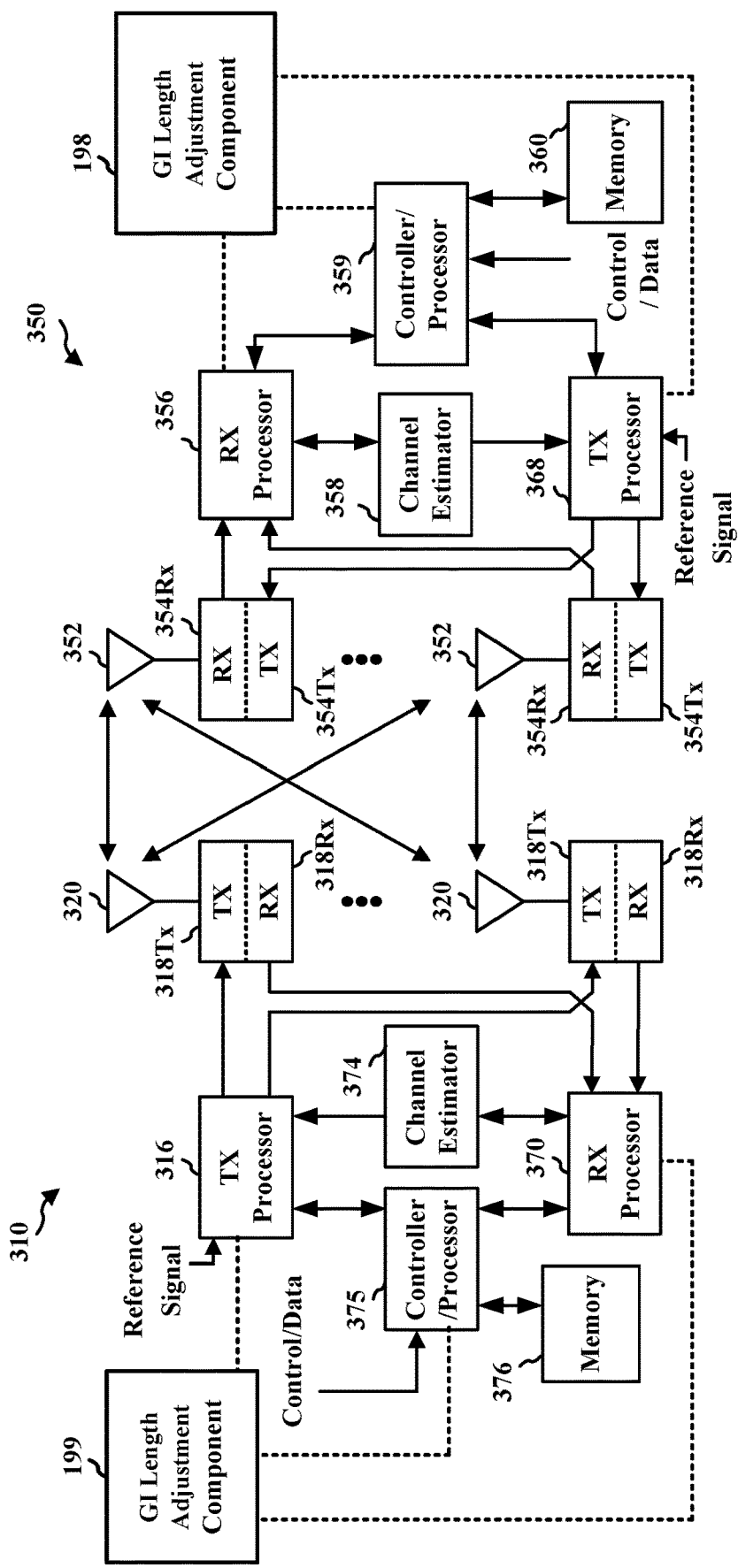
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the GI length adjustment component 198 of FIG. 1.

At least one of the TX processor 316, the RX processor 370, and the controller/processor 375 may be configured to perform aspects in connection with the GI length adjustment component 199 of FIG. 1.

The GI-based waveform is an alternative to the Cyclic Prefix (CP) based waveform. In the GI-based waveform (or GI waveform), each symbol may contain a fixed GI sequence at the ends, and the symbol may not contain a CP portion. A GI waveform design may provide the same time/frequency resources as a CP waveform.

Additionally, the GI waveform offers benefits, including the ability to adapt the GI length to per UE delay spread (DS) without affecting the symbol boundaries, the ability to have a phase/frequency tracking Reference Signal in the GI, the ability to estimate Cross Link Interference within a symbol in the GI duration, and the ability to switch beams in the GI duration.

As used herein, the "guard interval" (or GI) may refer to a fixed sequence (e.g., a GI sequence) that is within a symbol (e.g., within an FFT window) that is useful in mitigating inter-symbol-interference (ISI) due to delay spread in the wireless channel and that may also provide other functionalities, such as providing reference signals, estimating interferences, and providing gaps for beam switching. The term "guard interval length" may refer to the length of the GI sequence in the symbol. The "information indicative of the guard interval" may refer to information related to the characteristics of the GI, such as the length of the GI, the maximum length of the GI, the minimum length of the GI, the length range of the GI, and the like. For example, the length of the GI may be the number of GI samples configured per symbol considering other transmission parameters, and the maximum length of the GI may be the maximum number of GI samples required to be configured per symbol to avoid ISI considering the delay spread of the wireless channel.

Figure 4B:
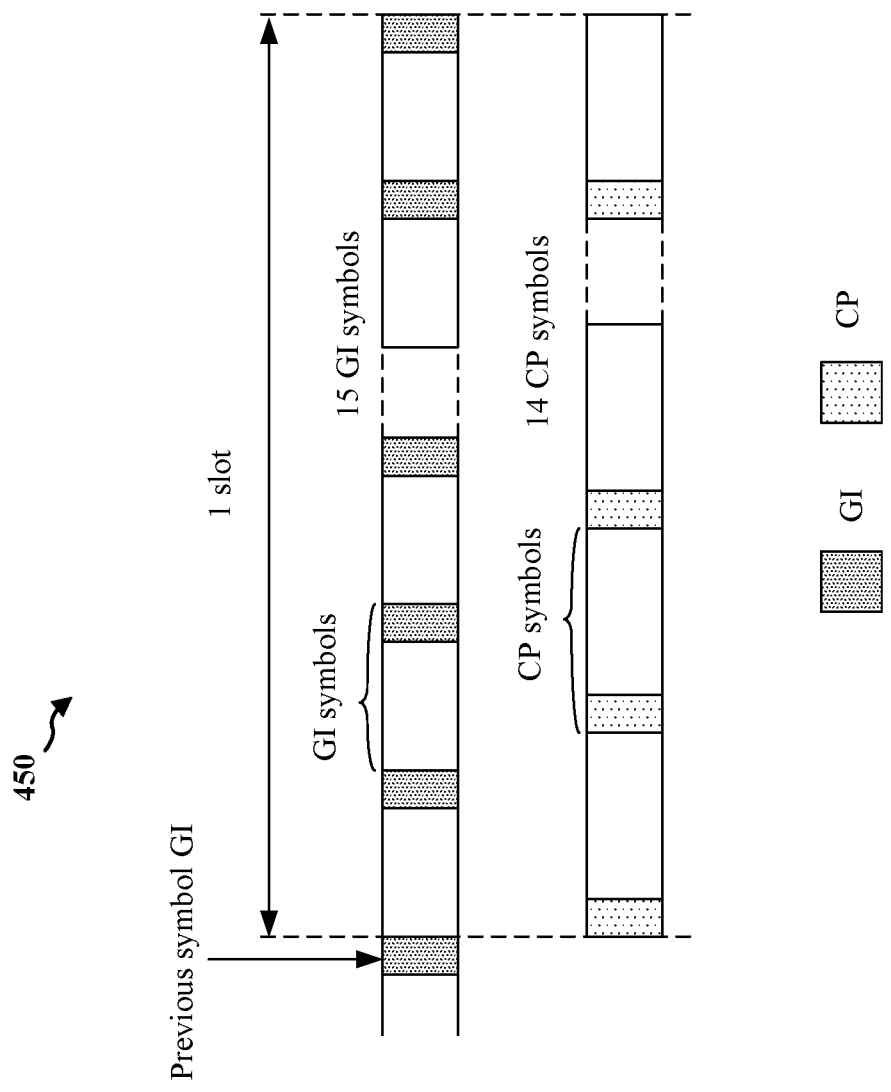
FIGS. 4A and 4B are diagrams illustrating example guard interval (GI) based waveform and cyclic prefix (CP) based waveform.
Figure 4A:
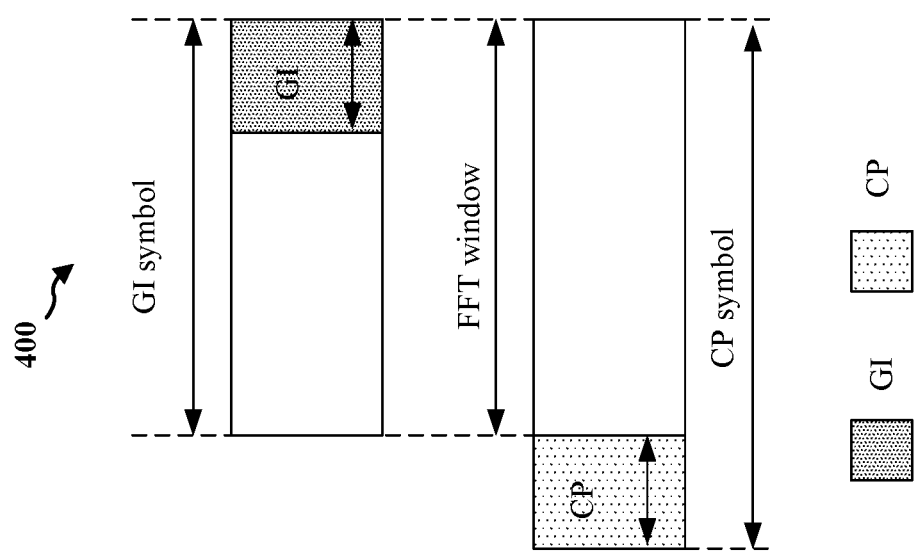

FIG. 4A is a diagram 400 illustrating an example GI symbol and an example CP symbol. As shown in FIG. 4A, a CP symbol (e.g., a CP Orthogonal Frequency Division Multiplexing (CP-OFDM) symbol) may have a CP portion outside the Fast Fourier transform (FFT) window. In contrast, a GI symbol (e.g., a GI-OFDM symbol) may have a GI portion within the FFT window. FIG. 4B is a diagram 450 illustrating GI and CP symbols in an example slot. In the example of FIG. 4B, the GI portions may remain the same across all the symbols, and the CP portions may change from symbol to symbol. As shown in FIG. 4B, a slot may include more GI symbols than CP symbols (e.g., 15 GI symbols vs. 14 CP symbols, as shown in FIG. 4B). In some examples, there may be hybrid CP and GI waveforms in a slot, in which both CP and GI symbols may be used. In that case, the number of symbols in a slot will vary according to configurations.

The GI-based waveform may be applicable to various frequency bands. In some aspects, the GI-based waveform may be applicable to higher bands since these bands may suffer from high phase noise, and the GI portion may be used for phase/frequency tracking in a symbol. For example, the higher bands may include FR4 or FR5. Like a CP waveform, the GI waveform may use various interference reduction mechanisms to enhance the transmission rate. For example, the GI waveform may use a single-tap Frequency Domain Equalizer (FDE), which allows the channel to be estimated and equalized in the frequency domain. There are multiple methods of generating a GI waveform. For example, a GI waveform may be generated via GI-OFDM or Unique Word OFDM waveform, GI-DFTs-OFDM waveform, or GI-Single Carrier waveform.

The length of the CP portion in a CP symbol may be fixed across the slots. On the other hand, the length of the GI portion in a GI symbol (number of GI samples per symbol) may be flexible to adapt to various UE configurations. For example, in wireless communication, a signal may reach a receiving antenna by two or more paths due to, for example, reflection or refraction of the signal (a phenomenon that may be referred to as multipath), and the signal component received over each of the two or more paths (the multipath component) may create interference with each other. One characteristic of a multipath transmission is the channel delay spread, which is the time difference between the arrival times of the earliest and the latest multipath components. A flexible GI length may support different channels that have different multipaths and use different lengths of GI to counter the interference among consecutively transmitted symbols, which may be referred to as inter-symbol interference (ISI). A flexible GI length may support low Modulation and Coding Scheme (MCS) at low SINR and may accommodate the degradation from the ISI and the interference between adjacent subcarriers, which may be referred to as inter-carrier interference (ICI), due to a reduced GI length. The GI length may also be dictated by other purposes, such as providing the additional reference signal, the beam switch gap (e.g., one or more symbols or a part of symbol whose transmission or reception may be affected when a beam switch occurs), the noise/interference measurement, etc. Further, it is beneficial to vary the Transport Block size according to the GI length so that the non-GI waveform portion can be fully utilized.

Figure 5:
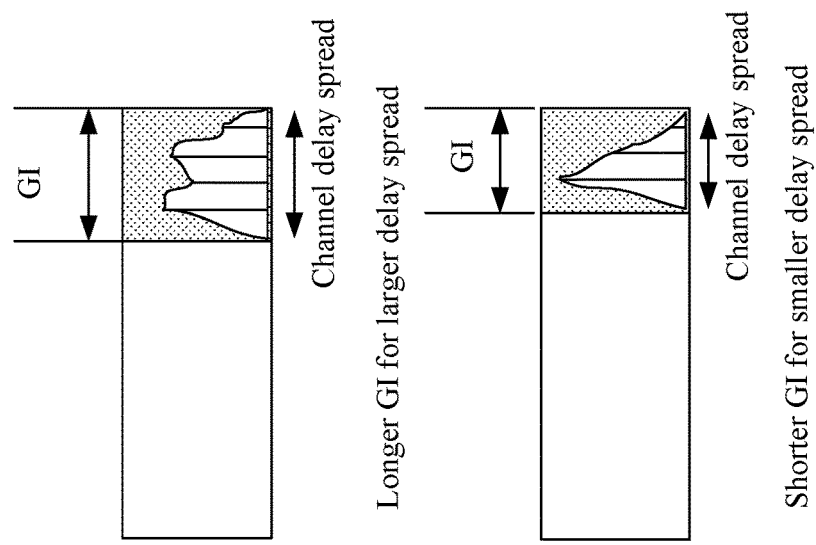
FIG. 5 is a diagram illustrating an example of adapting the GI lengths according to channel or waveform parameters, in accordance with various aspects of the present disclosure.
Figures 6A, 6B:
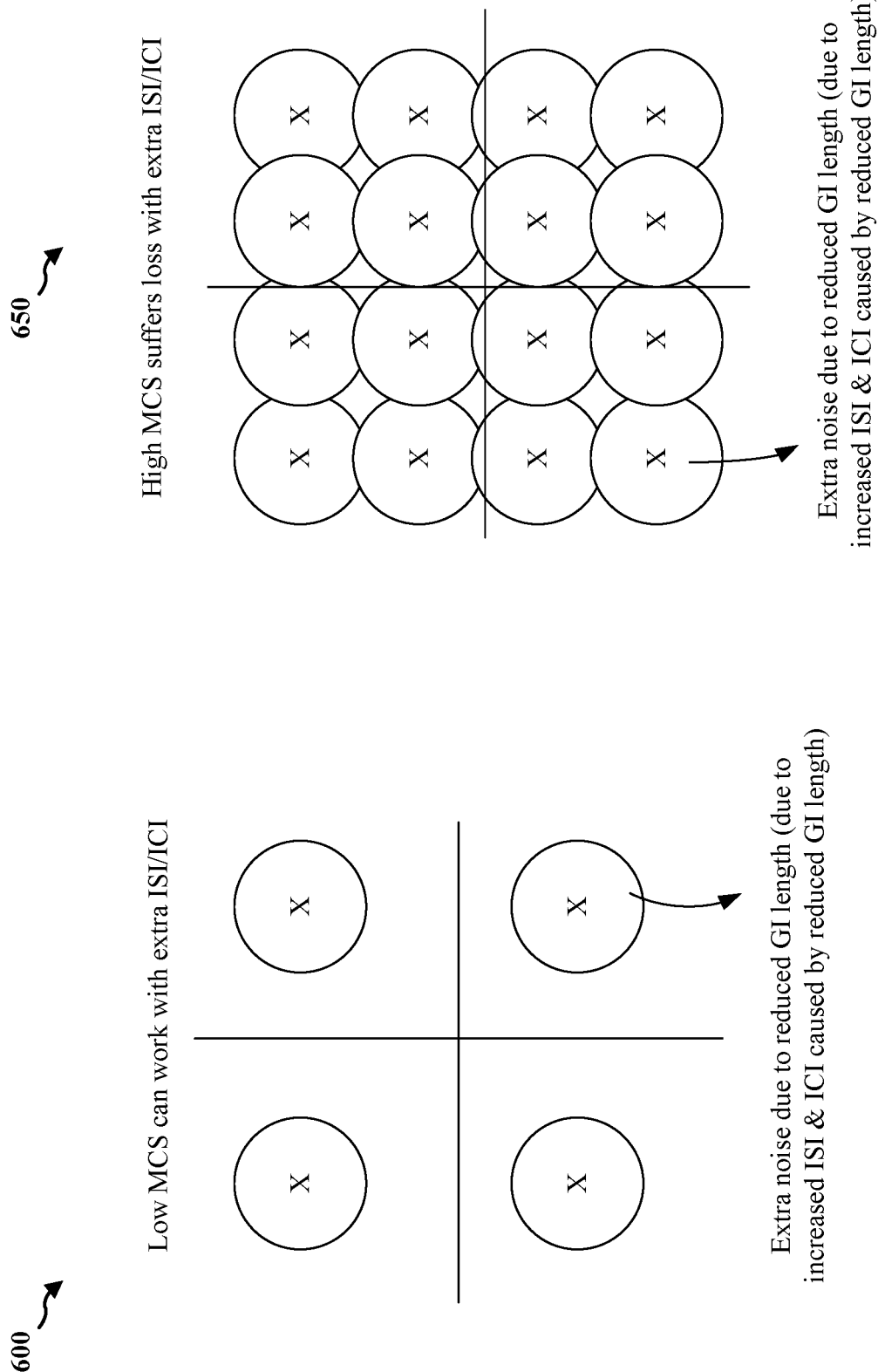
FIG. 6A is a diagram illustrating an example of adapting the GI lengths according to channel or waveform parameters, in accordance with various aspects of the present disclosure.
FIG. 6B is a diagram illustrating an example of adapting the GI lengths according to channel or waveform parameters, in accordance with various aspects of the present disclosure.

FIG. 5 is a diagram 500 illustrating an example of adapting the GI lengths according to channel or waveform parameters. As shown in FIG. 5, the length of the GI portion may adapt to the length of the channel delay spread. That is, a longer GI length may be used for a larger channel delay spread, and a shorter GI length may be used for a smaller channel delay spread. Shorter GI length may lead to a lower overhead and better throughput. FIGS. 6A and 6B are diagrams 600 and 650, respectively, illustrating another example of adapting the GI lengths according to the MCS. The MCS may specify the number of useful bits that can be carried by one symbol and specify a code occupation rate (which may also be referred to as a coding rate), which is a ratio between the number of useful bits (e.g., the bits used for transmitting signals) and the total number of transmitted bits. An MCS table may include multiple MCS configurations with different code occupation rates. Each of the MCS configurations in the MCS table may be identified by a corresponding MCS index (e.g., MCS 1, MCS 16). An MCS configuration with a smaller index (a lower MCS) may have a lower code occupation rate than an MCS configuration with a higher index (a higher MCS). For example, MCS 1 has a lower code occupation rate than MCS 16.

As shown in FIG. 6A, reducing GI length (e.g., to lesser than the channel delay spread) may produce ISI and ICI. However, a low MCS may tolerate the extra ISI/ICI as there may be sufficient spacings between neighboring constellation points (circles marked with "X" in FIG. 6A), which represent the phase shift (by the angle of a constellation point) and the amplitude (by the distance of a constellation point from the origin) of each of the carrier waves used in modulating a to-be-transmitted signal. Hence, the GI length may be relatively short at low MCS scenarios. On the other hand, as shown in FIG. 6B, a high MCS may not tolerate the extra ISI/ICI due to a reduced GI length, as shown by the overlapped constellation points. Hence, the GI length for a high MCS may be longer than the GI length for a low MCS to account for the higher sensitivity to channel delay spread at high MCS scenarios.

Example aspects herein present methods and apparatus for flexible GI lengths in a symbol based on various waveform or channel parameters.

In some aspects, the GI length may be configured flexibly depending on various waveform/channel parameters. In some examples, the flexible GI length may be derived by two procedures (i.e., Procedure 1 and Procedure 2) described below. In some examples, the flexible GI length may be derived by the second procedure (i.e., Procedure 2) described below (i.e., Procedure 1 may be skipped).

In the first procedure (i.e., Procedure 1), an estimation of the GI length (or the maximum GI length) may be provided for current wireless communication scenarios. In some examples, the maximum GI length may depend on the channel DS and may be estimated through channel measurements. The channel measurement may include, for example, SINR, SNR, Reference Signal Received Power (RSRP), BLER, Received Signal Strength Indication (RSSI), EVM, etc. In wireless communication, a transmission configuration indication (TCI) state may be used to establish the quasi-co-location (QCL) connection between a target RS and a source RS. Two antenna ports may be quasi-co-located (QCL-ed) if properties of the channel over which a symbol on one antenna port is conveyed can be inferred from the channel over which a symbol on the other antenna port is conveyed. The QCL connection between RSs may have different types (QCL types), indicating different relationships between the properties of the channels. In some aspects, a QCL relationship may indicate a relationship between signals with respect to one or more of: a Doppler shift, a Doppler spread, an average delay, a delay spread, a set of spatial Rx parameters, or the like. In some aspects, the QCL relationship may be based on different QCL type parameter(s). There may be different types of QCL relationships, in which a QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters. The channel measurements may be performed for one or more TCI states, which may be a currently active TCI state (the TCI state that is currently in use or a configured TCI state (the TCI state that is available for use), and using any applicable RS, such as DM-RS (post-precoding), SRS, CSI-RS, or SSB (before precoding). The measurement symbols may use a default long GI length to avoid ISI. In some examples, the measurement may be performed in DL, with the channel DS reported to the network entity. In some examples, the measurements may be performed in UL if the channel is non-reciprocal. In some examples, the network entity may be a base station, a component of a base station, or a core network component.

Figures 7A, 7B:
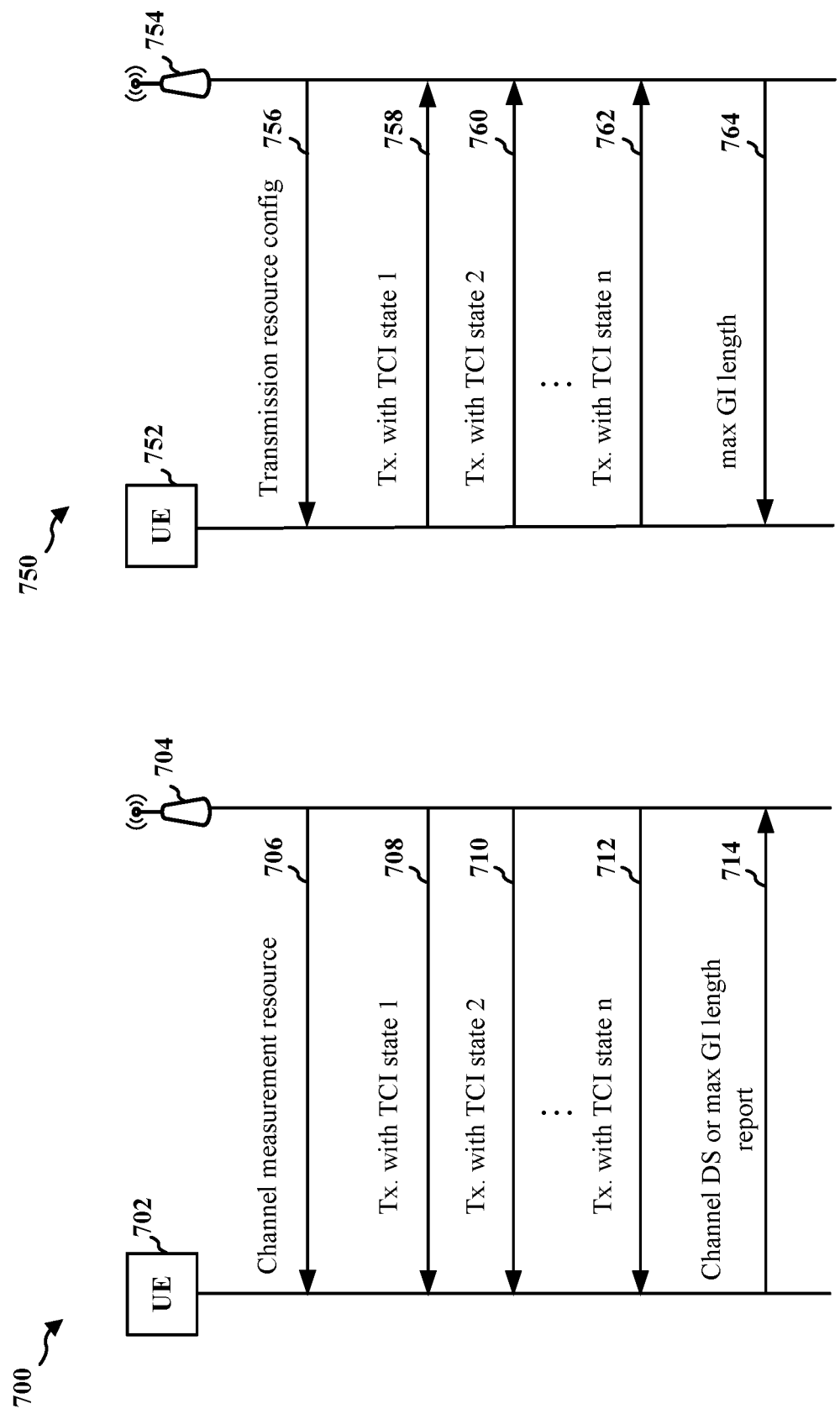
FIG. 7A is a call flow diagram illustrating the first procedure to estimate the maximum GI length, in accordance with various aspects of the present disclosure.
FIG. 7B is a call flow diagram illustrating the first procedure to estimate the maximum GI length, in accordance with various aspects of the present disclosure.

The measurement reports may contain the channel DS or the maximum GI length for each requested TCI state. In some examples, the maximum GI length (represented by, for example, parameter max_GI_len) may be chosen by the UE or the network entity to be sufficiently large to capture the main taps of the channel. FIG. 7A is a call flow diagram 700 illustrating the first procedure to estimate the maximum GI length for DL in accordance with various aspects of the present disclosure. As shown in FIG. 7A, in some aspects, a network entity 704 may configure, at 706, channel measurement resource to a UE 702. Network entity 704 may be, for example, a base station, a component of a base station, or a core network component. The network entity 704 may further transmit RSs (e.g., DM-RS, SRS, CSI-RS, or SSB) with one or more TCI states to the UE 702, for example, at 708, 710, and 712. The UE 702 may make the measurement on the RSs in DL and report, at 714, the estimated maximum GI length along with the channel DS to the network entity 704 based on the RSS transmitted with the one or more TCI states. FIG. 7B is a call flow diagram 750 illustrating the first procedure to estimate the maximum GI length for UL in accordance with various aspects of the present disclosure. As shown in FIG. 7B, in some aspects, a network entity 754 may transmit, at 756, transmission resource configuration to a UE 752. Network entity 754 may be, for example, a base station, a component of a base station, or a core network component. The UE 752 may transmit RSs (e.g., DM-RS, SRS, CSI-RS, or SSB) with one or more TCI states to the network entity 754, for example, at 758, 760, and 762. The network entity 754 may make the measurement on the RSs in UL and transmit, at 764, the estimated maximum GI length to the UE 752 based on the RSs transmitted with the one or more TCI states.

In the second procedure (i.e., Procedure 2), a fine GI length estimation may be performed based on the MCS and coding rate to be used. For a given maximum GI length (e.g., a given max_GI_len) estimated through the first procedure (i.e., Procedure 1), the fine GI length may be estimated depending on, for example, the operating SNR, MCS, coding rate, and target BLER.

The fine GI length may be estimated in various ways. For example, the fine GI length may be estimated based on at least one of: the frequency range associated with the transmission, the network entity type associated with at least one of the UE or the base station, the transmission type associated with the transmission, the beam switch associated with the transmission, the MCS associated with the transmission, the coding rate associated with the transmission, the recipient associated with the transmission (e.g., the desired recipient of the message is cell common or UE-specific), the usage type (e.g., Phase Tracking Reference signal (PTRS), or channel estimation, or time/frequency tracking) associated with the transmission, or the subcarrier spacing associated with the transmission. In one configuration, the fine GI length may be estimated using a measurement-based method. In an example measurement-based method, the network may configure measurements on a few candidate GI lengths, such as max_GI_len/4, max_GI_len/2, and max_G-I_len. One or more training symbols may be used to convey the information associated with the candidate GI lengths. The training symbols may consist of configured bits (e.g., a sequence of bits known by the transmitting and receiving ends) or RS signals (e.g., DM-RS, SRS, CSI-RS, or SSB), and the network may configure the measurements for one MCS or a few candidate MCS. The UE may measure, for example, a layer 1 (L1) metric, such as the average SINR per tone (i.e., OFDM subcarrier) and the number of bit errors, and report the measurement results to the network. The measurement metric may be quantized with thresholds into various groups, e.g., good, acceptable, and unacceptable. In one example, the UE may report the L1 metric, e.g., the average SINR per tone for each candidate GI length (or a subset of suitable candidates), and the network may decide the final GI length based on the reported L1 metric. In another example, the UE may report the best candidate GI length to the network.

Figure 8:
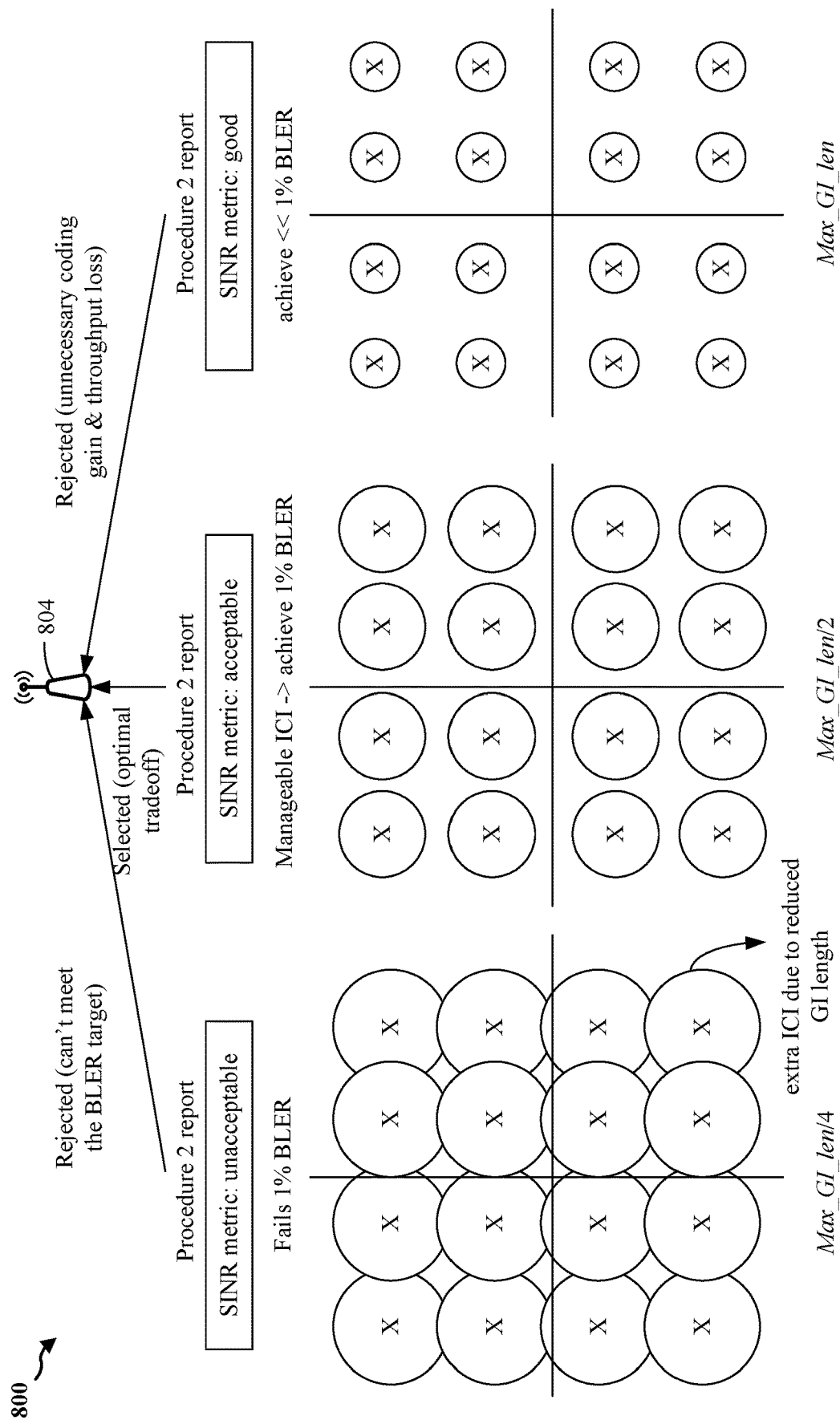
FIG. 8 is a diagram illustrating an example measurement-based GI length estimation method, in accordance with various aspects of the present disclosure.

FIG. 8 is a diagram 800 illustrating a measurement-based GI length estimation method in accordance with various aspects of the present disclosure. As shown in FIG. 8, multiple candidate GI lengths, such as max_GI_len/4, max_GI_len/2, and max_GI_len, may be tried to find the best candidate GI length that has sufficiently low ISI and ICI while using the minimum resources, and these multiple candidate lengths may be reported to a network entity 804. In the example shown in FIG. 8, using the candidate GI length max_GI_len/4 may not meet a 1% BLER target because of the extra ICI due to reduced GI length. Hence, the candidate GI length max_GI_len/4 may be rejected as it does not meet the BLER target. The candidate GI length max_GI_len, on the other hand, may achieve a BLER of much less than 1% target. However, it may also be rejected since it incurs a loss in coding gain or throughput (e.g., a longer GI length leads to fewer samples of data in a symbol, which may decrease the coding benefit or reduce throughput). The candidate GI length max_GI_len/2 may achieve 1% BLER target without the additional overhead incurred by max_GI_len. Hence, the candidate GI length max_GI_len/2 may be considered an optimal candidate length and be selected by network entity 804.

In another configuration, the fine GI length may be estimated according to a UE intelligence-based method. In an example UE intelligence-based method, the network may request the UE's suitable or desired a GI length (represented by, for example, parameter GI_length) for a candidate MCS (e.g., MCS 16) and a given transmission (e.g., for PDSCH on beam 1). In some examples, the UE may determine the GI length and send the determined GI length to the network in response to the network's request.

In some examples, the UE may autonomously send the suitable or desired GI length to the network independent of the network's request. For example, the UE may use internal calculation/table-lookup (without signaling from the network entity (e.g., a base station)) to report the expected SINR for each GI_length or the suitable or desired GI length. In some examples, the UE suitable or desired GI length (e.g., GI length) or a report that includes the expected SINR for each GI length may be sent in the first procedure (i.e., Procedure 1). For example, in Procedure 1, the UE may report the expected SINR for each of the candidate GI lengths (e.g., $SINR_1$ for GI_length_1, $SINR_2$ for GI_length_2, etc.). In some examples, Procedure 1 may also include a CSI report, which may include an SINR. In that case, the reported SINR may be for no-ISI cases, and the report that includes the expected SINR for each GI length may represent the SINR achieved under different levels of ISI (and ICI).

Figure 9:
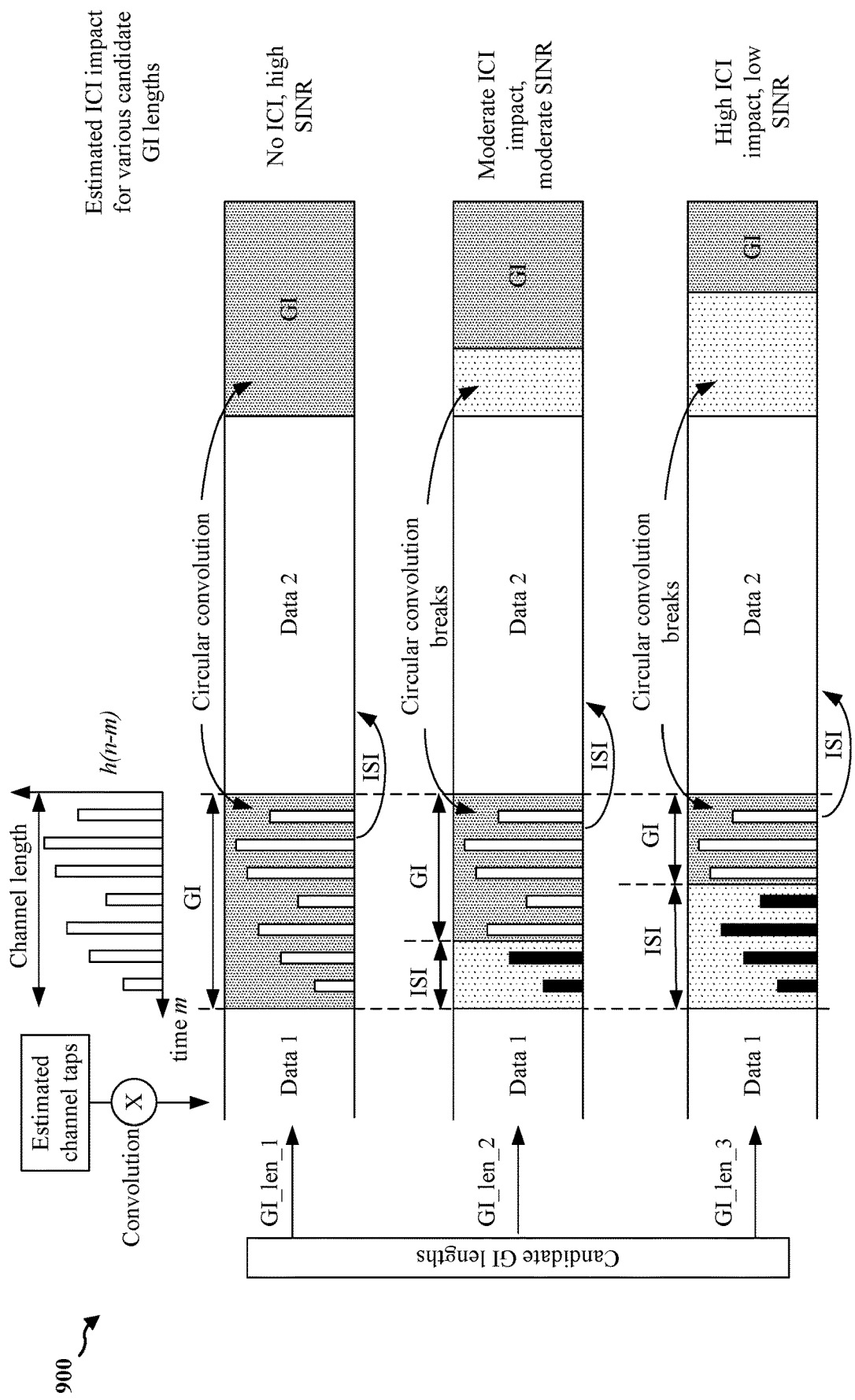
FIG. 9 is a diagram illustrating an example UE intelligence-based GI length estimation method, in accordance with various aspects of the present disclosure.

FIG. 9 is a diagram 900 illustrating an example UE intelligence-based GI length estimation method in accordance with various aspects of the present disclosure. As shown in FIG. 9, once the maximum GI length is estimated based on the channel DS, the UE may estimate a corresponding SINR for each of multiple candidate GI lengths that are less than the maximum GI length (e.g., GI_len_1, GI_len_2, and GI_len_3). A shorter GI length may result in a longer region subject to ISI, which may lead to a higher ICI impact. For example, as shown in FIG. 9, among the multiple candidate GI lengths, the shortest candidate GI length (i.e., GI_len_3) may result in the highest ICI impact and the lowest SINR. The UE may estimate the ICI impacts and the SINRs for various candidate GI lengths and report the suitable or desired GI length.

The measurement-based and UE intelligence-based methods enable the GI length to be chosen based on the UE's capability, such as ICI and ISI cancellation capability and the UE receiver complexity. The measurement-based and UE intelligence-based methods may provide differentiation among UEs while still being compliant with regulatory and standards requirements. In some examples, the network entity may override the UE suitable or desired GI length if indicated through additional signaling.

In another configuration, the fine GI length may be estimated according to a joint network and UE cooperation method. In an example joint network and UE cooperation method, the network may configure the GI_length for the UE based on MCS (and other parameters such as the symbol type) with assistance information from the UE. In some examples, the network may have configured GI length tables for each MCS (i.e., an MCS-vs-GI length table). The network may select a base GI length according to the MCS-vs-GI length table and request the UE to select a scale parameter (with some default scales). For example, the scale parameter may be 1, 2, or 4. The final GI length may be the base GI length scaled by the UE chosen scale parameter. In some examples, the network may have a two-dimensional table, from which the network may select the row according to the MCS, and the UE may select the column according to the desired characteristics of the GI. The final GI length may be the value of GI_length at the selected row and column in the two-dimensional table. In some examples, the network may override the UE's choice by transmitting additional signaling.

In some aspects, the first procedure (i.e., Procedure 1) and the second procedure (i.e., Procedure 2) may be done in succession to choose the final GI length. In some aspects, the flexible GI length may be derived by the second procedure alone, and the first procedure (i.e., Procedure 1) may be skipped. In that case, instead of deriving an estimation of the GI length (or the maximum GI length) through the first procedure (i.e., Procedure 1), the network entity and the UE may assume the maximum GI length (i.e., parameter max_GI_length) to be a nominal value. For example, the nominal value may be the same as that for CP-OFDM (e.g., approximately 7% of the symbol for normal CP). Then, the flexible GI length may be derived by the second procedure based on the assumed maximum GI length.

In some aspects, the parameter GI length (and, similarly, parameter max_GI length) may be suitably divided into two lengths, e.g., a header_GI_length and a tail_GI_length. Such a division may facilitate various configurations, such as Out-of-Band (OOB) reduction (reduction of the radiation originated from the sidelobes of the modulated subcarriers in OFDM systems), Weighted OverLap and Add (WoLA) (a windowing technique for OFDM) or other configurations. Similarly, the delay spread to GI_length mapping can correspond to any header_GI_length, tail_GI_length, or the total GI_length as the case is, depending on the Rx FFT window.

Figures 10A, 10B, 10C:
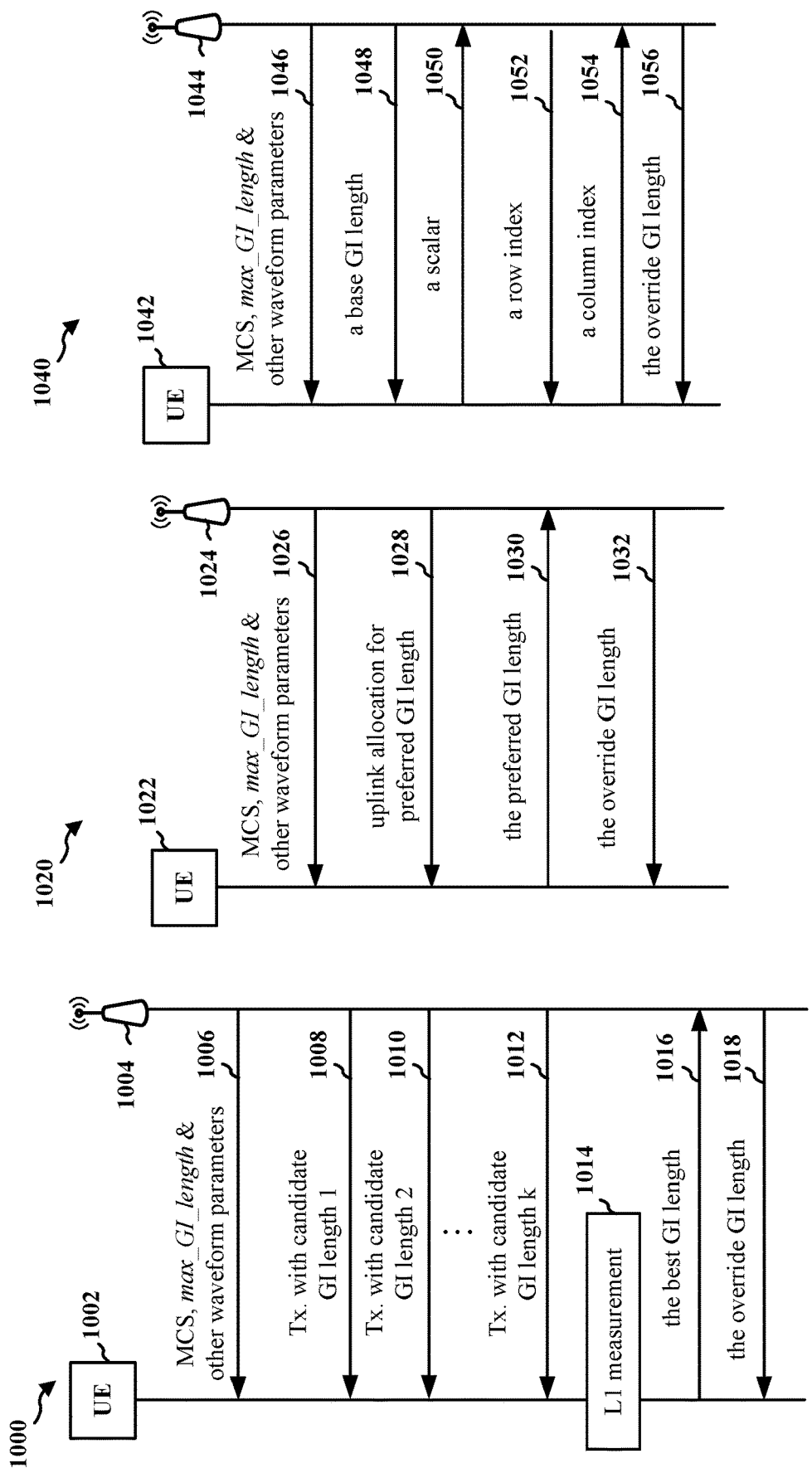
FIG. 10A is a call flow diagram illustrating the second procedure to estimate the GI length, in accordance with various aspects of the present disclosure.
FIG. 10B is a call flow diagram illustrating the second procedure to estimate the GI length, in accordance with various aspects of the present disclosure.
FIG. 10C is a call flow diagram illustrating the second procedure to estimate the GI length, in accordance with various aspects of the present disclosure.

FIG. 10A is a call flow diagram 1000 illustrating a measurement-based second procedure to estimate the GI_length in accordance with various aspects of the present disclosure. In the example of FIG. 10A, a network entity 1004 may first transmit, at 1006, MCS, max_GI_length, and other waveform parameters (e.g., the desired BLER, desired throughput, selected TB size) to the UE 1002 which may help the UE estimate or select an appropriate GI length. Network entity 1004 may be, for example, a base station, a component of a base station, or a core network component. The max_GI_length may be derived from Procedure 1 or be assumed to be some nominal values. The network entity 1004 may further transmit one or more candidate GI lengths to the UE 1002, for example, at 1008, 1010, and 1012. The UE 1002 may make an L1 measurement at 1014 and report, at 1016, the best GI length among the candidate GI lengths to the network entity 1004. In some examples, the network entity 1004 may override the best GI length the UE 1002 reports at 1016 (e.g., indicate an override GI length that is different from the best GI length the UE 1002 reports) and transmit, at 1018, the override GI length to the UE 1002.

FIG. 10B is a call flow diagram 1020 illustrating a UE intelligence-based second procedure to estimate the GI length in accordance with various aspects of the present disclosure. In the example of FIG. 10B, a network entity 1024 may first transmit, at 1026, MCS, max_GI_length, and other waveform parameters to the UE 1022 which may help the UE estimate or select an appropriate GI length. Network entity 1024 may be, for example, a base station, a component of a base station, or a core network component. Parameter max_GI_length may be derived from Procedure 1 or be assumed to be some nominal values. The network entity 1024 may further transmit, at 1028, the uplink allocation for the suitable or desired GI length to the UE 1022. The UE 1022 may report, at 1030, the suitable or desired GI length to the network entity 1024. In one example, as shown in FIG. 9, the suitable or desired GI length may be a GI length (e.g., one of GI_len_1, GI_len_2, or GI_len_3) that meets the ICI and SINR configurations. In some examples, the network entity 1024 may override the suitable or desired GI length the UE 1022 reports (at 1030) and transmit, at 1032, an override GI length to the UE 1022.

FIG. 10C is a diagram 1040 illustrating a joint network & UE cooperation based second procedure to estimate the GI length in accordance with various aspects of the present disclosure. In the example of FIG. 10C, a network entity 1044 may first transmit, at 1046, MCS, max_GI_length and other waveform parameters to the UE 1042 which may help the UE estimate or select an appropriate GI length. Network entity 1044 may be, for example, a base station, a component of a base station, or a core network component. The max_GI_length may be derived from Procedure 1 or be assumed to be some nominal values. In some examples, the network entity 1044 may further transmit, at 1048, a base GI length to the UE 1042, and the UE 1042 may report, at 1050, a scalar corresponding to the base GI length to the network entity 1044. The suitable or desired GI length may be determined based on the base GI length and the scalar. In some examples, network entity 1044 may further transmit, at 1052, a row index of the MCS-vs-GI_length table to the UE 1042, and the UE 1042 may report, at 1054, a column index of the MCS-vs-GI_length table to the network entity 1044. The suitable or desired GI length may be determined based on the row index and the column index of the MCS-vs-GI_length table. In some examples, the network entity 1044 may override the suitable or desired GI length and transmit, at 1056, an override GI length to the UE 1042.

In some aspects, the network may configure the GI length according to the transmission type (e.g., data transmission or control transmission) to account for different Quality of Service (QOS) configurations. For example, the network may configure the GI length differently depending on whether the transmission is a data transmission (e.g., PDSCH/PUSCH) or a control transmission (e.g., PDCCH/PUCCH). For example, the network may configure the GI length differently depending on whether the transmission type is a common transmission (e.g., SSB, RACH msg 1) or a UE-specific transmission (e.g., CSI-RS).

In some aspects, the network may configure different GI lengths for symbols between which a beam switching is configured. The configured GI lengths may vary with the beam-switching gap configurations under different scenarios. For example, for a beam switch between two DL beams or two UL beams, a first GI length (e.g., GI_length_1) may be configured, and for a panel switch in DL or UL (as indicated by the UE to the network entity), a second GI length (e.g., GI_length_2) may be configured. In some examples, the second GI length may be larger than the first GI length. Additionally, for a switch between DL & UL, or DL & SL, or UL & SL, a third GI length (e.g., GI_length_3) may be configured, and for a switch between Half Duplex & Full Duplex mode with potentially multiple panels being retuned (e.g., Full Duplex may specify at least two panels, one for Tx, one for Rx. Beam switch on both panels may need both panels to be retuned, which may take similar or more time as Half Duplex), a fourth GI length (e.g., GI_length_4) may be is configured. As used herein, In some aspects, the network may configure different GI lengths depending on the frequency of operation and the cell type (e.g., macro-cell, micro-cell, pico-cells, or femto-cell). For example, a higher band (e.g., FR2-2) may have lower delay spreads than a lower band (e.g., FR1). Thus, different bands may use different GI lengths. In the case of Carrier Aggregation (CA), various Component Carriers may have different GI lengths according to their frequency of operation. Large cells (e.g., macro-cell) may have larger delay spreads than small cells (e.g., micro-cell, pico-cell, or femto-cell). Hence, larger cells may be assigned longer GI lengths than smaller cells.

In some aspects, the GI length may be UE-specific (determined for and associated with a particular UE). For example, the GI length may depend on each UE's wireless channel and scenario. For example, cell edge users may have larger GI lengths to counter the long delay spreads that may be present on the cell edge, whereas center users may have smaller GI lengths.

In some aspects, the GI length may be dictated according to a reference signal. For example, the network may assign a longer GI length than suggested by the procedures described above in order to transmit (or receive) a GI sequence that serves as a reference signal for purposes such as phase tracking/frequency tracking/channel estimation, etc. Alternatively, a UE may request a longer GI length in order to transmit (or receive) a reference signal in the GI.

Figure 11:
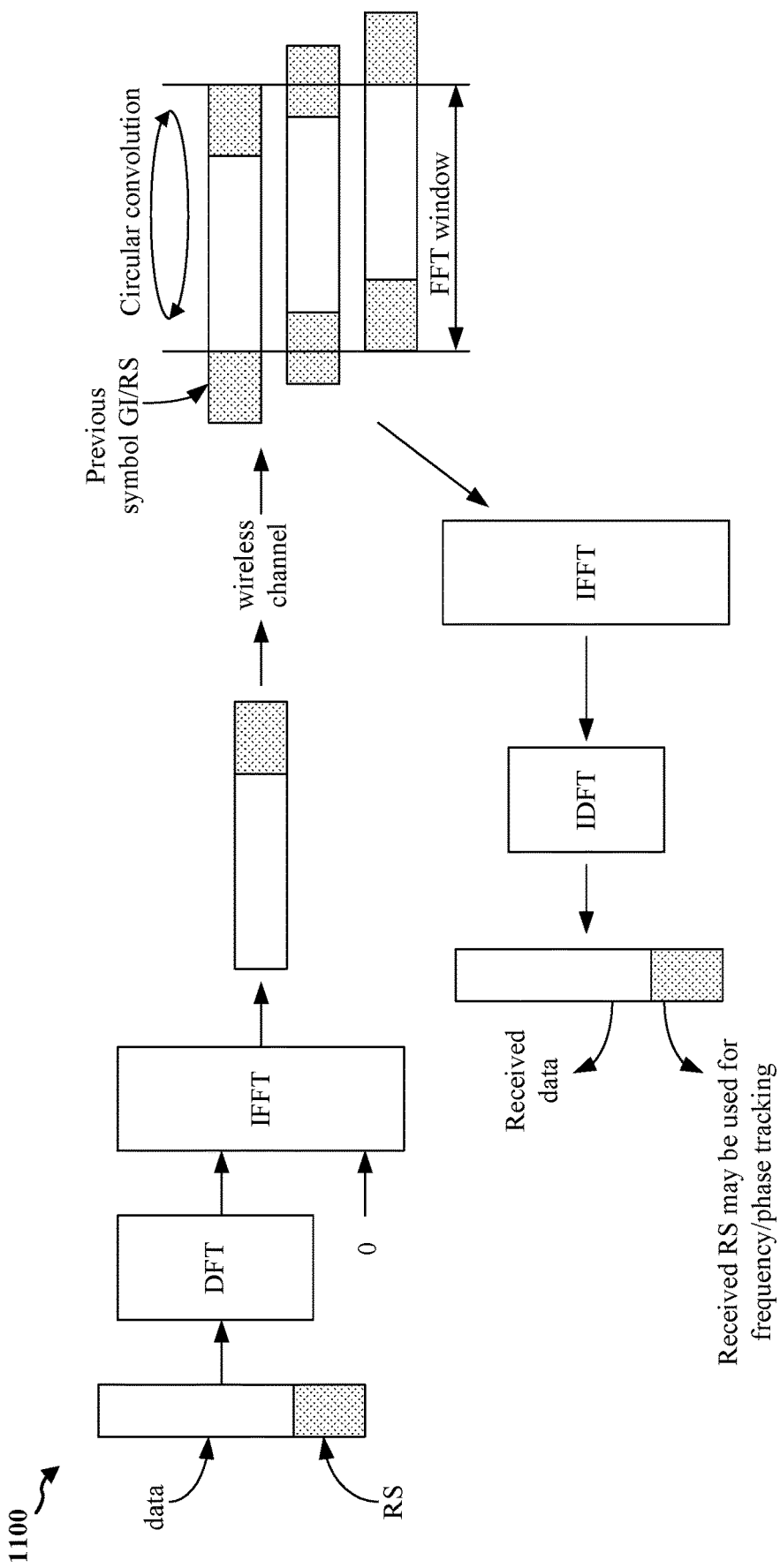
FIG. 11 is a diagram illustrating a single user GI-discrete Fourier transform (DFT) spread OFDM (DFT-s-OFDM) (GI-DFT-s-OFDM) transmission and reception with a reference signal (RS) in the GI portion, in accordance with various aspects of the present disclosure.

FIG. 11 is a diagram 1100 illustrating a single user GI-DFTs-OFDM transmission and reception with an RS in the GI portion in accordance with various aspects of the present disclosure. As shown in FIG. 11, An RS may be located at the GI portion of a GI symbol. At the receiving end, the received RS may be used for, for example, frequency/phase tracking purposes. Due to the existence of the RS in the GI portion, the network may assign a longer GI length than a GI length estimated without the RS. The UE may also request a longer GI length to account for the RS that may be transmitted or received in the GI portion. Though FIG. 11 only shows RS at the end of the symbol, other implementations may have RS at both the beginning and the end of the symbol.

In some aspects, the TB size may vary with the GI length. In one configuration, a dynamic TB size may be used to account for the actual GI length. The dynamic TB size may derive the most benefit from the dynamic GI length, including higher throughput and coding gain. In another configuration, a nominal TB size may be used for each MCS and channel delay spread. In yet another configuration, a nominal TB size may be used for each MCS or for each channel DS. The nominal TB size may allow the adjustment of the code rate as the actual GI length changes. A nominal TB size may change less frequently than the dynamic TB size and result in less signaling overhead while still obtaining the coding benefit from the variable GI length.

Figure 12:
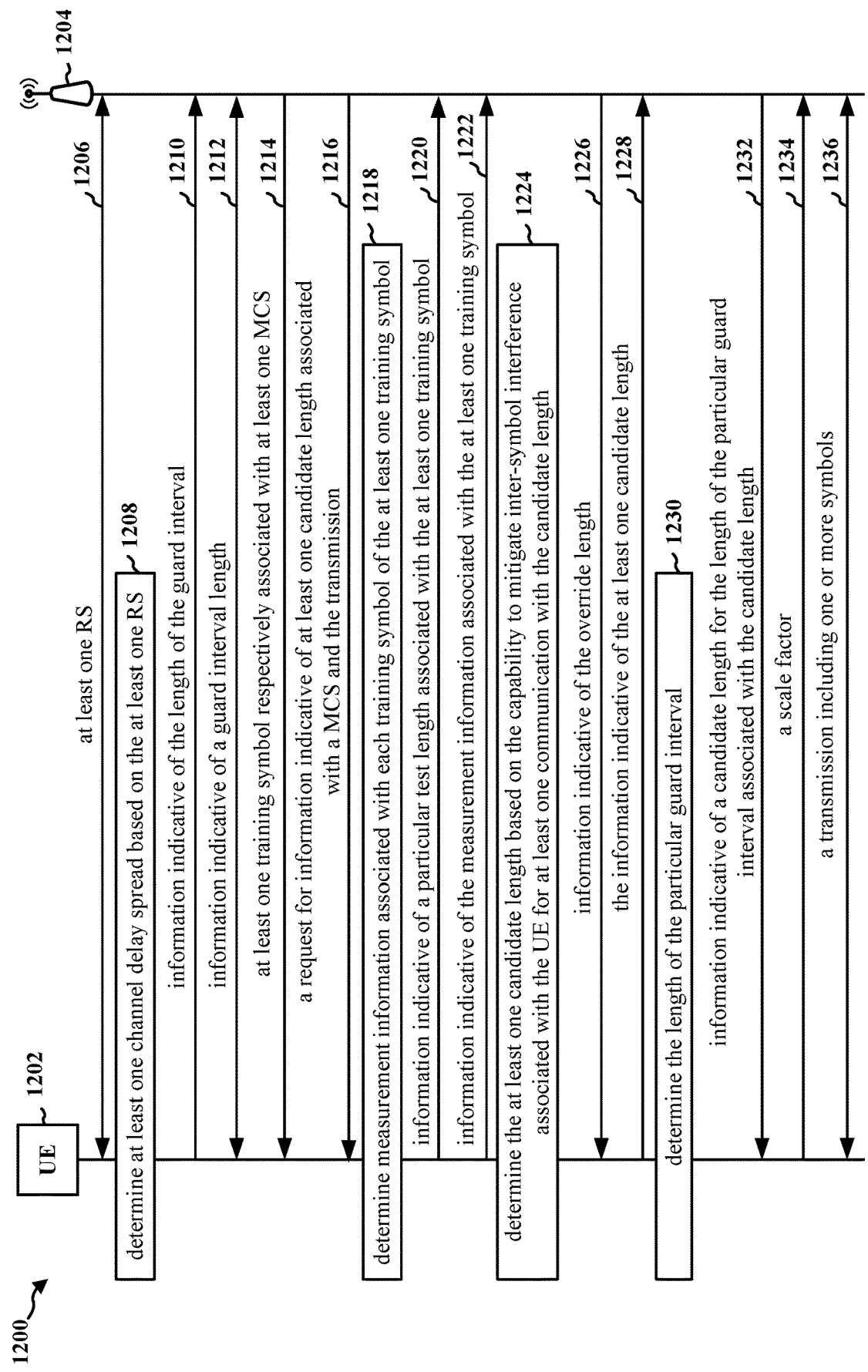
FIG. 12 is a call flow diagram illustrating a method of wireless communication in accordance with various aspects of the present disclosure.

FIG. 12 is a call flow diagram 1200 illustrating a method of wireless communication in accordance with various aspects of this present disclosure. Aspects are described in connection with a network entity 1204, which may be, for example, a base station in aggregation and/or by one or more components of a network entity 1204 (e.g., such as a CU 110, a DU 130, and/or an RU 140).

As shown in FIG. 12, in some aspects, at 1206, the UE 1202 may receive from, or transmit to, network entity 1204 at least one RS. For example, referring to FIGS. 7A and 7B, the UE (702, 752) may receive from, or transmit to, the network entity (704, 754) at least one RS with a few TCI states (e.g., at 708, 710, 712, 758, 760, and 762). The at least one RS may be any applicable RS, such as DM-RS (post-precoding), SRS, CSI-RS, or SSB (before precoding).

In some aspects, at 1208, the UE 1202 may determine at least one channel delay spread based on the at least one RS. For example, referring to FIG. 7A, the UE 702 may determine at least one channel delay spread based on the at least one RS (e.g., the RS associated with the TCI states at 708, 710, and 712). Each channel delay spread of the at least one channel delay spread may be associated with a respective TCI state (e.g., TCI states at 708, 710, and 712).

In some aspects, at 1210, the UE 1202 may transmit, to network entity 1204, information indicative of the length of the guard interval. For example, referring to FIG. 11, due to the existence of the RS in the GI portion, the UE may transmit to the network entity information indicative of the length of the guard interval (e.g., the UE may request a longer GI length to account for the RS that may be transmitted or received in the GI portion).

At 1212, the UE 1202 may communicate, with network entity 1204, information indicative of the guard interval length. The information indicative of the guard interval length may be based on transmission information. For example, referring to FIG. 7A, the UE 702 may communicate with network entity 704 information indicative of a guard interval length (e.g., max_GI_length at 714). Referring to FIG. 10A, the UE 1002 may communicate with network entity 1004 information indicative of a guard interval length (e.g., max_GI_length at 1006). The information indicative of the guard interval length may be based on transmission information.

In some aspects, at 1214, the UE 1202 may receive, from network entity 1204, at least one training symbol respectively associated with at least one MCS. Each training symbol of the at least one training symbol may include a respective test guard interval. For example, referring to FIG. 10A, the UE 1002 may receive, from network entity 1004, at least one training symbol respectively associated with at least one MCS (e.g., at 1006). Each training symbol of the at least one training symbol may include a respective test guard interval.

In some aspects, at 1216, the UE 1202 may receive, from network entity 1204, a request for information indicative of at least one candidate length associated with an MCS and the transmission. For example, referring to FIG. 10B, the UE 1022 may receive, at 1028, from network entity 1024, a request for information indicative of at least one candidate length (e.g., the uplink allocation for the suitable or desired GI length) associated with an MCS and the transmission.

In some aspects, at 1218, the UE 1202 may determine the measurement information associated with each training symbol of the at least one training symbol. For example, referring to FIG. 10A, the UE 1002 may determine the measurement information (e.g., L1 measurement at 1014) associated with each training symbol of the at least one training symbol.

In some aspects, at 1220, the UE 1202 may transmit, to network entity 1204, information indicative of a particular test length associated with the at least one training symbol. For example, referring to FIG. 10A, the UE 1002 may transmit, to network entity 1004, at 1016, information indicative of a particular test length (e.g., the best GI length at 1016) associated with the at least one training symbol.

In some aspects, at 1222, the UE 1202 may transmit, to network entity 1204, information indicative of the measurement information associated with the at least one training symbol. For example, referring to FIG. 8, the UE may transmit, to network entity 804, information indicative of the measurement information (e.g., BLER and SINR metric) associated with the at least one training symbol.

In some aspects, at 1224, the UE 1202 may determine the at least one candidate length based on the capability to mitigate inter-symbol interference associated with the UE 1202 for at least one communication with the candidate length. For example, referring to FIG. 9, the UE may determine the at least one candidate length (e.g., one candidate length among GI_len_1, GI_len_2, and GI_len_3) based on ISI and ICI associated with the UE.

In some aspects, at 1226, the UE 1202 may receive, from network entity 1204, information indicative of the override length. In some examples, the length of a particular guard interval may be equal to the override length. For example, referring to FIGS. 10A, 10B, and 10C, the UE (1002, 1022, or 1042) may receive (at 1018, 1032, or 1056) from the network entity (1004, 1024, or 1044) information indicative of the override length (e.g., the override GI length). The length of the particular guard interval may be equal to the override length.

In some aspects, at 1228, the UE 1202 may transmit, to network entity 1204, the information indicative of the at least one candidate length. The length of the particular guard interval may be equal to one of the at least one candidate length or an override length. For example, referring to FIG. 10B, the UE 1022 may transmit, at 1030, to network entity 1024, the information indicative of the at least one candidate length (e.g., the suitable or desired GI length at 1030).

In some aspects, at 1230, the UE 1202 may determine the length of the particular guard interval based on the at least one candidate length of the particular guard interval. For example, the network entity may have a two-dimensional table, from which the network may select the row according to the MCS, and the UE may select the column according to desired characteristics of a GI. The final GI length may be the GI value at the selected row and column in the two-dimensional table.

In some aspects, at 1232, the UE 1202 may receive, from network entity 1204, information indicative of a candidate length for the length of the particular guard interval associated with the candidate length. For example, referring to FIG. 10C, the UE 1042 may receive, at 1048, from network entity 1044, information indicative of a candidate length (e.g., the base GI length at 1048) for the length of the particular guard interval associated with the candidate length.

In some aspects, at 1234, the UE 1202 may transmit, to network entity 1204, a scale factor. The length of the particular guard interval may be equal to the candidate length (at 1232) multiplied by the scale factor. For example, referring to FIG. 10C, the UE 1042 may transmit, at 1050, to network entity 1044, a scale factor. The length of the particular guard interval may be equal to the candidate length (e.g., the base GI length at 1048) multiplied by the scale factor.

At 1236, the UE 1202 may communicate, with network entity 1204, a transmission including one or more symbols. Each symbol of the one or more symbols may include the particular guard interval based on the information indicative of the guard interval length. For example, the particular guard interval may be the particular guard interval at 1230, 1234 (which is the candidate length (at 1232) multiplied by the scale factor at 1234).

Figure 13:
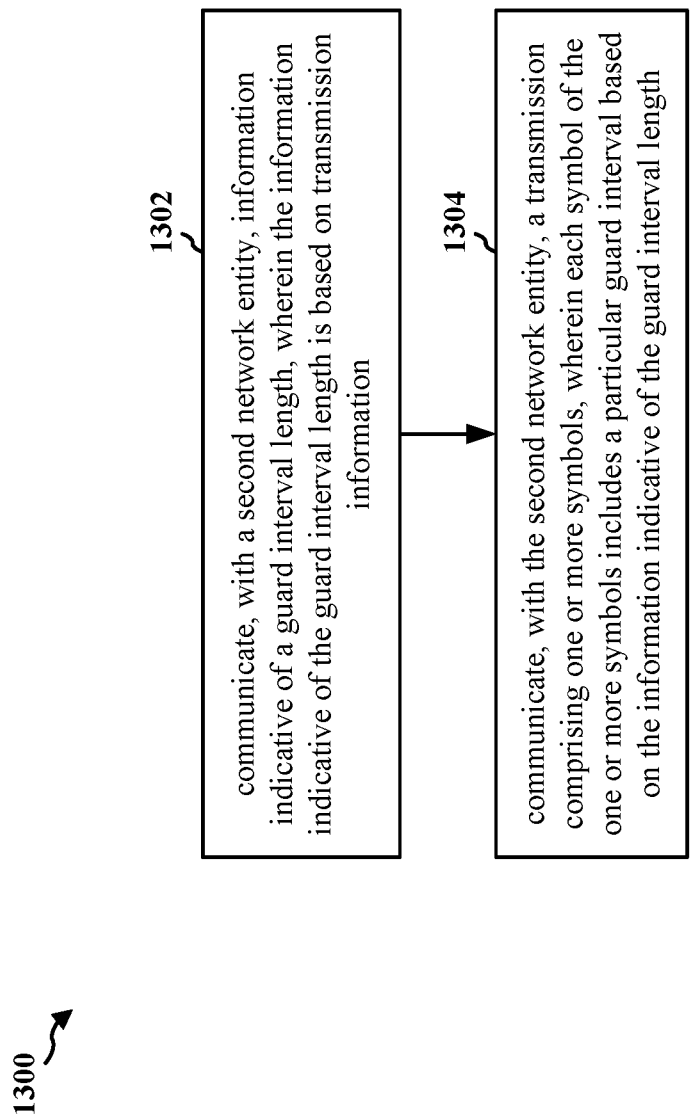
FIG. 13 is the first flowchart illustrating methods of wireless communication at a first network entity in accordance with various aspects of the present disclosure.

FIG. 13 is a flowchart 1300 illustrating methods of wireless communication at a first entity in accordance with various aspects of the present disclosure. The method may be performed by the first network entity, which may be, for example, a UE. The UE may be UE 104, 350, 702, 752, 1002, 1022, 1042, and 1202, or the apparatus 1604 in the hardware implementation of FIG. 16. The method enables the GI length to be flexibly configured depending on various waveforms or channel parameters and characteristics of the transmission. The method enables transmission resources to be fully utilized according to actual operating conditions. Thus, it improves the efficiency and flexibility of wireless communication.

As shown in FIG. 13, at 1302, the first network entity may communicate, with a second network entity, information indicative of a guard interval length. The information indicative of the guard interval length may be based on transmission information. The second network entity may be, for example, a base station or a component of a base station, in the access network of FIG. 1 or a core network component (e.g., base station 102, 310; network entity 704, 754, 1004, 1024, 1044, 1204; or the network entity 1602 in the hardware implementation of FIG. 16). In the description in connection with flowchart 1300, a UE may be used as an example first network entity, and a base station may be used as an example second network entity. In another example, the UE may be the second network entity and the base station may be the first network entity. In another example, the first network entity and the second network entity may be both UEs. In some aspects, the first network entity may be a base station, a component of a base station, or a core network component, and the second network entity may be a UE. FIGS. 7A, 7B, 8, 9, 10A, 10B, 10C, 11, and 12 illustrate various aspects of the steps in connection with flowchart 1300. For example, referring to FIG. 12, the UE 1202 may communicate, at 1212, with a network entity 1204, information indicative of a guard interval length. The information indicative of the guard interval length may be based on transmission information. Referring to FIG. 7A, the UE 702 may communicate with network entity 704 information indicative of a guard interval length (e.g., max_GI_length at 714). Referring to FIG. 10A, the UE 1002 may communicate with network entity 1004 information indicative of a guard interval length (e.g., max_GI_length at 1006). In some aspects, 1302 may be performed by the GI length adjustment component 198.

At 1304, the first network entity may communicate, with the second network entity, a transmission including one or more symbols. Each symbol of the one or more symbols may include a particular guard interval based on the information indicative of the guard interval length. For example, referring to FIG. 12, the UE 1202 may communicate, at 1236, with network entity 1204, a transmission including one or more symbols. Each symbol of the one or more symbols may include a particular guard interval based on the information indicative of the guard interval length. In some aspects, 1304 may be performed by the GI length adjustment component 198.

Figure 14:
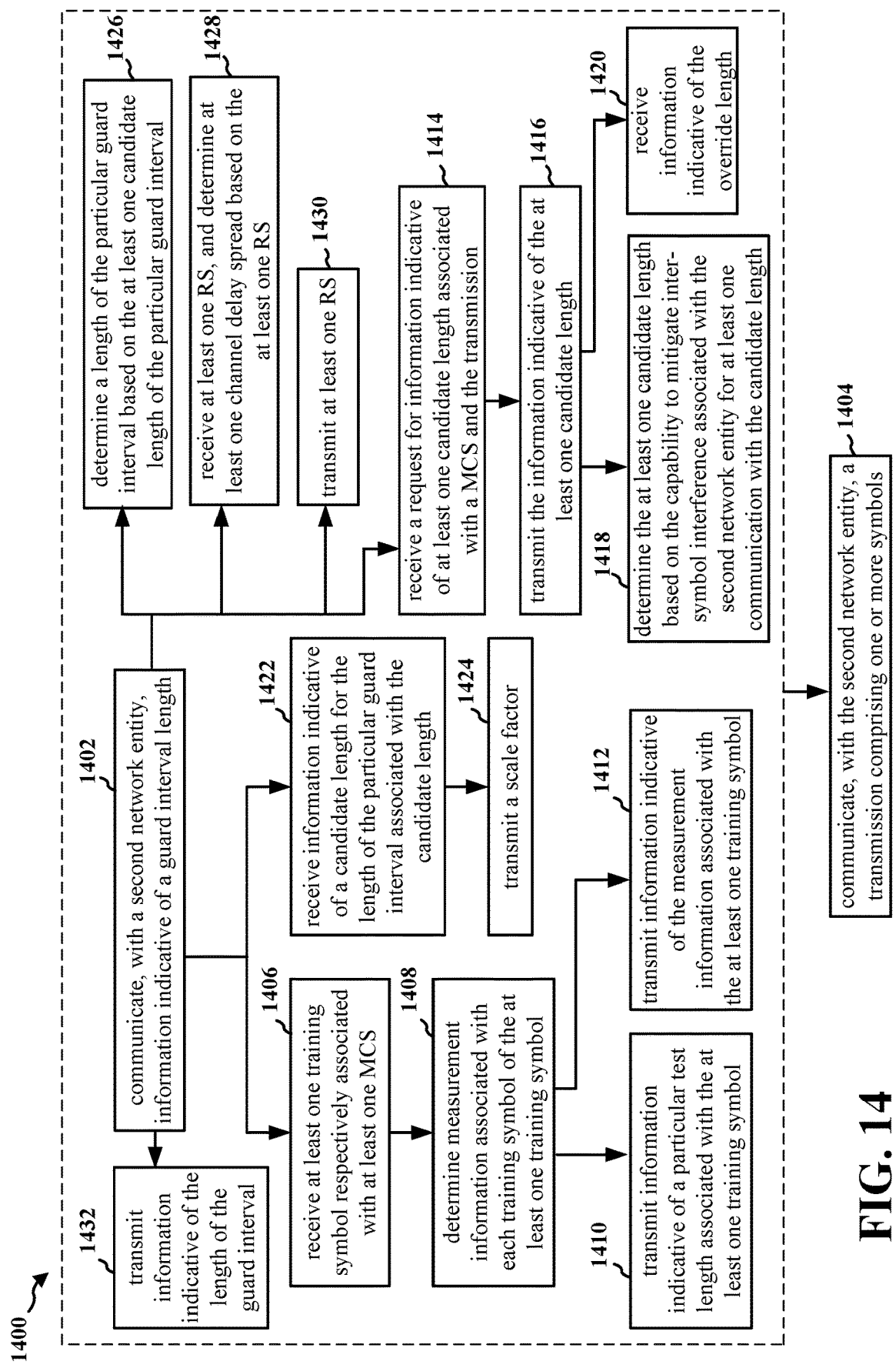
FIG. 14 is the second flowchart illustrating methods of wireless communication at a first network entity in accordance with various aspects of the present disclosure.

FIG. 14 is a flowchart 1400 illustrating methods of wireless communication at a first network entity in accordance with various aspects of the present disclosure. The method may be performed by the first network entity, which may be, for example, a UE. The UE may be the UE 104, 350, 702, 752, 1002, 1022, 1042, and 1202, or the apparatus 1604 in the hardware implementation of FIG. 16. The method enables the GI length to be flexibly configured depending on various waveforms or channel parameters and characteristics of the transmission. The method enables transmission resources to be fully utilized according to actual operating conditions. Thus, it improves the efficiency and flexibility of wireless communication.

As shown in FIG. 14, at 1402, the first network entity may communicate, with a second network entity, information indicative of a guard interval length. The information indicative of the guard interval length may be based on transmission information. The second network entity may be a base station, or a component of a base station, in the access network of FIG. 1 or a core network component (e.g., base station 102, 310; network entity 704, 754, 1004, 1024, 1044, 1204; or the network entity 1602 in the hardware implementation of FIG. 16). In the description in connection with flowchart 1400, a UE may be used as an example first network entity, and a base station may be used as an example second network entity. These examples, however, are not intended to be limiting. In some aspects, the first network entity may be a base station, a component of a base station, or a core network component, and the second network entity may be a UE. FIGS. 7A, 7B, 8, 9, 10A, 10B, 10C, 11, and 12 illustrate various aspects of the steps in connection with flowchart 1400. For example, referring to FIG. 12, the UE 1202 may communicate, at 1212, with a network entity 1204, information indicative of a guard interval length. The information indicative of the guard interval length may be based on transmission information. Referring to FIG. 7A, the UE 702 may communicate with network entity 704 information indicative of a guard interval length (e.g., max_GI_length at 714). Referring to FIG. 10A, the UE 1002 may communicate with network entity 1004 information indicative of a guard interval length (e.g., max_GI_length at 1006). In some aspects, 1402 may be performed by the GI length adjustment component 198.

At 1404, the first network entity may communicate, with the second network entity, a transmission including one or more symbols. Each symbol of the one or more symbols may include a particular guard interval based on the information indicative of the guard interval length. For example, referring to FIG. 12, the UE 1202 may communicate, at 1236, with network entity 1204, a transmission including one or more symbols. Each symbol of the one or more symbols may include a particular guard interval based on the information indicative of the guard interval length. In some aspects, 1404 may be performed by the GI length adjustment component 198.

In some aspects, the transmission information may include information indicative of at least one channel delay spread, the frequency range associated with the transmission, the network entity type (e.g., whether the network entity is a macro-cell, a micro-cell, pico-cells, or a femto-cell) associated with at least one of the first network entity or the second network entity, the transmission type associated with the transmission, the beam switch associated with the transmission, the MCS associated with the transmission, the coding rate associated with the transmission, the recipient associated with the transmission, the usage type associated with the transmission, or the subcarrier spacing associated with the transmission. For example, referring to FIG. 12, when the UE 1202 communicates, at 1212, with network entity 1204 information indicative of a guard interval length based on the transmission information, the transmission information may include information indicative of at least one channel delay spread, the frequency range associated with the transmission, the network entity type associated with at least one of the UE 1202 or the network entity 1204, the transmission type associated with the transmission, the beam switch associated with the transmission, the MCS associated with the transmission, the coding rate associated with the transmission, the recipient associated with the transmission, the usage type associated with the transmission, or the subcarrier spacing associated with the transmission.

In some aspects, the information indicative of the guard interval length may be information indicative of the length of the particular guard interval. The length of the particular guard interval may be based on at least one of the transmission information or measurement information. For example, referring to FIG. 8, the information indicative of the guard interval length may be information indicative of the length of the particular guard interval (e.g., max_GI_len_4, max_GI_len_2, or max_GI_len).

In some aspects, the measurement information may include the BLER, the SNR, the quality metric, the SINR, the EVM, or the throughput. For example, referring to FIG. 8, the measurement information may include the BLER and the SINR metric.

In some aspects, when the first network entity is a UE and the second network entity is a base station, a component of a base station, or a core network component, the first network entity may receive, at 1406, from the second network entity, at least one training symbol respectively associated with at least one MCS. Each training symbol of the at least one training symbol may include a respective test guard interval. For example, referring to FIG. 12, the UE 1202 may receive, at 1214, from network entity 1204, at least one training symbol respectively associated with at least one MCS. Referring to FIG. 10A, the UE 1002 may receive, from network entity 1004, at least one training symbol respectively associated with at least one MCS (e.g., at 1006). Each training symbol of the at least one training symbol may include a respective test guard interval (e.g., candidate GI length 1 at 1008, candidate GI length 2 at 1010). In some aspects, 1406 may be performed by the GI length adjustment component 198.

At 1408, the first network entity may determine the measurement information associated with each training symbol of the at least one training symbol. For example, referring to FIG. 12, the UE 1202 may determine, at 1218, measurement information associated with each training symbol of the at least one training symbol. Referring to FIG. 10A, the UE 1002 may determine the measurement information (e.g., L1 measurement, at 1014) associated with each training symbol of the at least one training symbol. In some aspects, 1408 may be performed by the GI length adjustment component 198.

In some aspects, at 1410, the first network entity may transmit, to the second network entity, information indicative of a particular test length associated with the at least one training symbol. For example, referring to FIG. 12, the UE 1202 may transmit, at 1220, to network entity 1204, information indicative of a particular test length associated with the at least one training symbol. Referring to FIG. 10A, the UE 1002 may transmit, to network entity 1004, at 1016, information indicative of a particular test length (e.g., the best GI length at 1016) associated with the at least one training symbol. In some aspects, 1410 may be performed by the GI length adjustment component 198.

In some aspects, at 1412, the first network entity may transmit, to the second network entity, information indicative of the measurement information associated with the at least one training symbol. For example, referring to FIG. 12, the UE 1202 may transmit, at 1222, to network entity 1204, information indicative of the measurement information associated with the at least one training symbol. Referring to FIG. 8, the UE may transmit, to network entity 804, information indicative of the measurement information (e.g., BLER and SINR metric) associated with the at least one training symbol. In some aspects, 1412 may be performed by the GI length adjustment component 198.

In some aspects, at 1414, the first network entity may receive, from the second network entity, a request for information indicative of at least one candidate length associated with the MCS and the transmission. For example, referring to FIG. 12, the UE 1202 may receive, at 1216, from network entity 1204, a request for information indicative of at least one candidate length associated with the MCS and the transmission. Referring to FIG. 10B, the UE 1022 may receive, at 1028, from network entity 1024, a request for information indicative of at least one candidate length (e.g., the uplink allocation for the suitable or desired GI length) associated with the MCS and the transmission. In some aspects, 1414 may be performed by the GI length adjustment component 198.

At 1416, the first network entity may transmit, to the second network entity, the information indicative of the at least one candidate length. The length of the particular guard interval may be equal to one of the at least one candidate length or an override length. For example, referring to FIG. 12, the UE 1202 may transmit, at 1228, to network entity 1204, the information indicative of the at least one candidate length. The length of the particular guard interval may be equal to one of the at least one candidate length or an override length. Referring to FIG. 10B, the UE 1022 may transmit, at 1030, to network entity 1024, the information indicative of the at least one candidate length (e.g., the suitable or desired GI length at 1030). In some aspects, 1416 may be performed by the GI length adjustment component 198.

In some aspects, at 1418, the first network entity may determine the at least one candidate length based on the capability to mitigate inter-symbol interference associated with the first network entity for at least one communication with the candidate length. For example, referring to FIG. 12, the UE 1202 may determine, at 1224, the at least one candidate length based on the capability to mitigate inter-symbol interference associated with the UE 1202 for at least one communication with the candidate length. Referring to FIG. 9, the UE may determine the at least one candidate length (among GI_len_1, GI_len_2, and GI_len_3) based on ISI and ICI associated with the UE. In some aspects, 1418 may be performed by the GI length adjustment component 198.

In some aspects, when the first network entity is a UE and the second network entity is a base station, a component of a base station, or a core network component, the first network entity may receive, at 1420, from the second network entity, information indicative of the override length. The length of the particular guard interval may be equal to the override length. For example, referring to FIG. 12, the UE 1202 may receive, at 1226, from network entity 1204, information indicative of the override length. The length of the particular guard interval may be equal to the override length. Referring to FIGS. 10A, 10B, and 10C, the UE (1002, 1022, or 1042) may receive (at 1018, 1032, or 1056), from the network entity (1004, 1024, or 1044) information indicative of the override length (e.g., the override GI length). The length of the particular guard interval may be equal to the override length. In some aspects, 1420 may be performed by the GI length adjustment component 198.

In some aspects, to communicate the information indicative of the guard interval length, the first network entity may be configured to transmit, to the second network entity, information indicative of the guard interval length, information indicative of the at least one candidate length, and information indicative of at least one quality metric associated with the at least one candidate length. For example, referring to FIG. 9, the UE may transmit to the network entity information indicative of the guard interval length. The information indicative of the at least one candidate length (e.g., GI_len_1, GI_len_2, and GI_len_3), and information indicative of at least one quality metric associated with the at least one candidate length (e.g., ICI impact and SINR associated with GI_len_1, GI_len_2, and GI_len_3).

At 1422, the first network entity may receive, from the second network entity, information indicative of a candidate length for the length of the particular guard interval associated with the candidate length. For example, referring to FIG. 12, the UE 1202 may receive, from network entity 1204, information indicative of a candidate length for the length of the particular guard interval associated with the candidate length. Referring to FIG. 10C, the UE 1042 may receive, at 1048, from the network entity 1044, information indicative of a candidate length (e.g., the base GI length at 1048) for the length of the particular guard interval associated with the candidate length. In some aspects, 1422 may be performed by the GI length adjustment component 198.

At 1424, the first network entity may transmit, to the second network entity, a scale factor. The length of the particular guard interval may be equal to the candidate length multiplied by the scale factor. For example, referring to FIG. 12, the UE 1202 may transmit, at 1234, to network entity 1204, a scale factor. The length of the particular guard interval may be equal to the candidate length multiplied by the scale factor. Referring to FIG. 10C, the UE 1042 may transmit, at 1050, to the network entity 1044 a scale factor. The length of the particular guard interval may be equal to the candidate length (e.g., the base GI length at 1048) multiplied by the scale factor. In some aspects, 1424 may be performed by the GI length adjustment component 198.

In some aspects, the information indicative of the guard interval length may be information indicative of at least one candidate length of the particular guard interval from a set of possible lengths. The at least one candidate length may be based on an MCS associated with the transmission. For example, referring to FIG. 10C, the information indicative of the guard interval length may be a row index received at 1052. The row index may indicate at least one candidate length of the particular guard interval from a set of possible lengths (the lengths in a table identifiable by the row index at 1052 and the column index at 1054). The at least one candidate length may be based on an MCS associated with the transmission (received at 1046).

At 1426, the first network entity may determine the length of the particular guard interval based on the at least one candidate length of the particular guard interval. For example, referring to FIG. 12, the UE 1202 may determine, at 1230, the length of the particular guard interval based on the at least one candidate length of the particular guard interval. In some aspects, 1426 may be performed by the GI length adjustment component 198.

In some aspects, the information indicative of the guard interval length may be information indicative of the length of the particular guard interval from a set of possible lengths. For example, referring to FIG. 10C, the information indicative of the guard interval length may be information indicative of the length of the particular guard interval from a set of possible lengths (e.g., a set of possible lengths identifiable by the row index at 1052 and the column index at 1054).

At 1428, the first network entity may receive at least one RS, and determine at least one channel delay spread based on the at least one RS. The transmission information may include information indicative of the at least one channel delay spread. Each channel delay spread of the at least one channel delay spread may be associated with a respective TCI state. For example, referring to FIG. 12, the UE 1202 may receive, at 1206, at least one RS, and determine, at 1208, at least one channel delay spread based on the at least one RS. In some aspects, 1428 may be performed by the GI length adjustment component 198.

In some aspects, to determine the at least one channel delay spread, the first network entity may be configured to measure the at least one RS. For example, referring to FIG. 7A, the UE 702 may be configured to measure the at least one RS (associated with the TCI states at 708, 710, etc.).

In some aspects, to communicate the information indicative of the guard interval length, the first network entity may be configured to transmit the information indicative of the guard interval length to the second network entity. To communicate the transmission, the first network entity may be configured to receive, from the second network entity, the transmission. For example, referring to FIG. 7A, the UE 702 may be configured to transmit the information indicative of the guard interval length (e.g., max GI length at 714) to the network entity 704. The UE may be configured to receive, at 708, 710, etc., the transmission from the network entity 704. At 1430, the first network entity may transmit at least one RS. For example, referring to FIG. 12, the UE 1202 may transmit, at 1206, at least one RS to network entity 1204. In some aspects, 1430 may be performed by the GI length adjustment component 198.

In some aspects, to communicate the information indicative of the guard interval length, the first network entity may be configured to receive the information indicative of the guard interval length from the second network entity. To communicate the transmission, the first network entity may be configured to transmit, to the second network entity, the transmission. For example, referring to FIG. 7B, the UE 752 may be configured to receive, at 764, the information indicative of the guard interval length (e.g., max GI length at 764) from the network entity 754. The UE 752 may be configured to transmit, to the network entity 754, the transmission (e.g., transmission with TCI states at 758, 760, etc.).

In some aspects, the information indicative of the guard interval length may be information indicative of the maximum guard interval length. The length of the particular guard interval may be based on the information indicative of the maximum guard interval length and based on at least one of the transmission information or measurement information. For example, referring to FIG. 10A, the information indicative of the guard interval length may be information indicative of the maximum guard interval length (e.g., max_GI_length at 1006). The length of the particular guard interval may be based on the information indicative of the maximum guard interval length (e.g., max_GI_length at 1006) and based on at least one of the transmission information or measurement information.

In some aspects, the measurement information may include the BLER, the SNR, the quality metric, the SINR, the EVM, the throughput. For example, referring to FIG. 8, the measurement information may include the BLER and the SINR metric.

Referring back to 1406, in some aspects, when the first network entity is a UE and the second network entity is a base station, a component of a base station, or a core network component, the first network entity may receive, from the second network entity, at least one training symbol respectively associated with at least one MCS. Each training symbol of the at least one training symbol may include a respective test guard interval having a respective test length less than the maximum guard interval length. For example, referring to FIG. 12, the UE 1202 may receive, at 1214, from network entity 1204, at least one training symbol respectively associated with at least one MCS. Referring to FIG. 10A, the UE 1002 may receive, from network entity 1004, at least one training symbol respectively associated with at least one MCS (e.g., at 1006). Each training symbol of the at least one training symbol may include a respective test guard interval having a respective test length less than the maximum guard interval length (e.g., max_GI_length at 1006).

At 1432, the first network entity may transmit, to the second network entity, information indicative of the length of the guard interval. The transmission may be associated with a reference signal. For example, referring to FIG. 12, the UE 1202 may transmit, at 1210, to network entity 1204, information indicative of the length of the guard interval. The transmission may be associated with a reference signal (at 1206). In some aspects, 1432 may be performed by the GI length adjustment component 198.

In some aspects, the TB size associated with the transmission may be based on the length of the particular guard interval. For example, referring to FIG. 12, the TB size associated with the transmission (at 1236) may be based on the length of the particular guard interval (e.g., the length of the particular guard interval determined at 1230).

In some aspects, the TB size associated with the transmission may not be based on the length of the particular guard interval, and the coding rate associated with the transmission may be based on the length of the particular guard interval. For example, referring to FIG. 12, the TB size associated with the transmission (at 1236) may not be based on the length of the particular guard interval, and the coding rate associated with the transmission (at 1236) may be based on the length of the particular guard interval (e.g., the length of the particular guard interval determined at 1230).

In some aspects, the information indicative of the guard length may be based on at least one channel delay spread that satisfies a threshold based on the transmission information. For example, referring to FIG. 12, the information indicative of the guard length (at 1212) may be based on at least one channel delay spread that satisfies a threshold based on the transmission information.

In some aspects, the particular guard interval may be present in each symbol of the one or more symbols at the start of the symbol, at the end of the symbol, or split between the start of the symbol or the end of the symbol. For example, referring to FIG. 12, when the UE 1202 communicates the transmission with network entity 1204 at 1236. The transmission may include one or more symbols each including a particular guard interval. The particular guard interval may be present in each symbol of the one or more symbols at the start of the symbol, at the end of the symbol, or split between the start of the symbol or the end of the symbol.

In some aspects, the information indicative of the guard interval length may be information indicative of the maximum guard interval length, the minimum guard interval length, the guard interval length range, or the length of the particular guard interval. For example, referring to FIG. 12, when the UE 1202 communicates, at 1212, the information indicative of the guard interval length with network entity 1204, the information indicative of the guard interval length may be information indicative of the maximum guard interval length, the minimum guard interval length, the guard interval length range, or the length of the particular guard interval.

Figure 15:
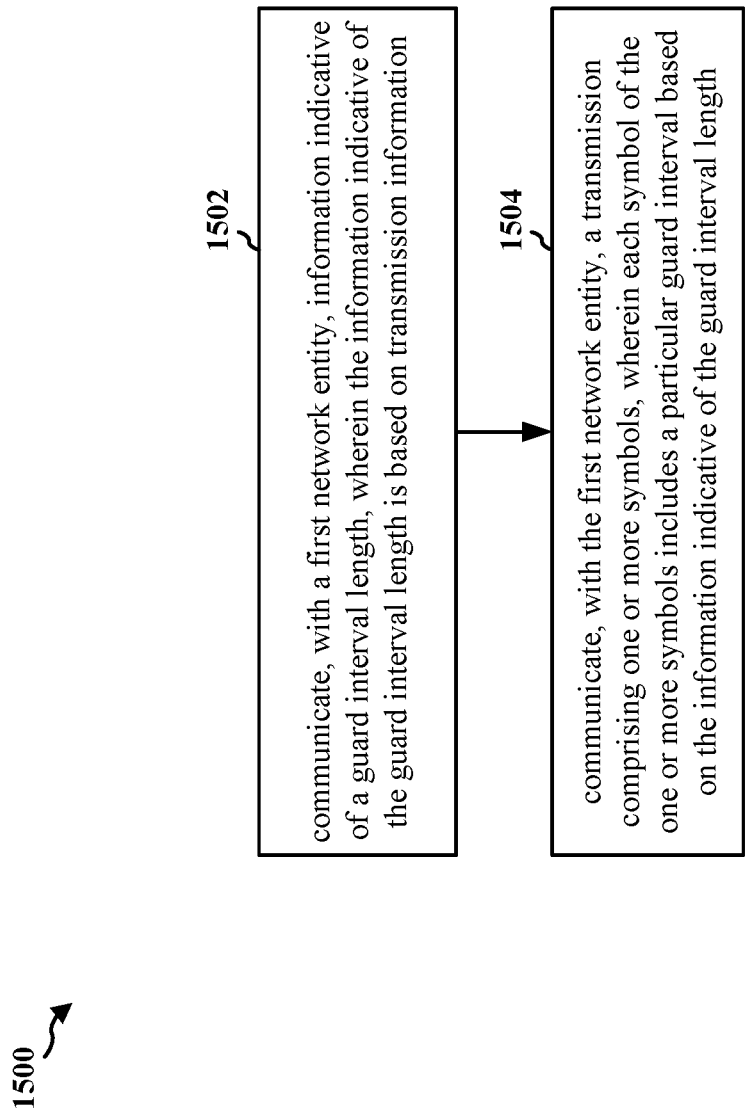
FIG. 15 is the first flowchart illustrating methods of wireless communication at a second network entity in accordance with various aspects of the present disclosure.

FIG. 15 is a flowchart 1500 illustrating methods of wireless communication at a second network entity in accordance with various aspects of the present disclosure. The method may be performed by the second network entity, which may be, for example, a base station, or a component of a base station, in the access network of FIG. 1 or a core network component (e.g., base station 102, 310; network entity 704, 754, 1004, 1024, 1044, 1204; or the network entity 1602 in the hardware implementation of FIG. 16). The method enables the GI length to be flexibly configured depending on various waveforms or channel parameters and characteristics of the transmission. The method enables transmission resources to be fully utilized according to actual operating conditions. Thus, it improves the efficiency and flexibility of wireless communication.

As shown in FIG. 15, at 1502, the second network entity may communicate, with a first network entity, information indicative of a guard interval length. The information indicative of the guard interval length may be based on transmission information. The first network entity may be, for example, a UE. The UE may be UE 104, 350, 702, 752, 1002, 1022, 1042, and 1202, or the apparatus 1604 in the hardware implementation of FIG. 16. FIGS. 7A, 7B, 8, 9, 10A, 10B, 10C, 11, and 12 illustrate various aspects of the steps in connection with flowchart 1500. For example, referring to FIG. 12, network entity 1204 may communicate, at 1212, with a UE 1202, information indicative of a guard interval length. The information indicative of the guard interval length may be based on transmission information. In some aspects, 1502 may be performed by the GI length adjustment component 199.

At 1504, the second network entity may communicate, with the first network entity, a transmission including one or more symbols. Each symbol of the one or more symbols includes a particular guard interval based on the information indicative of the guard interval length. For example, referring to FIG. 12, network entity 1204 may communicate, at 1236, with the UE 1202, a transmission including one or more symbols. Each symbol of the one or more symbols may include a particular guard interval based on the information indicative of the guard interval length. In some aspects, 1504 may be performed by the GI length adjustment component 199.

Figure 16:
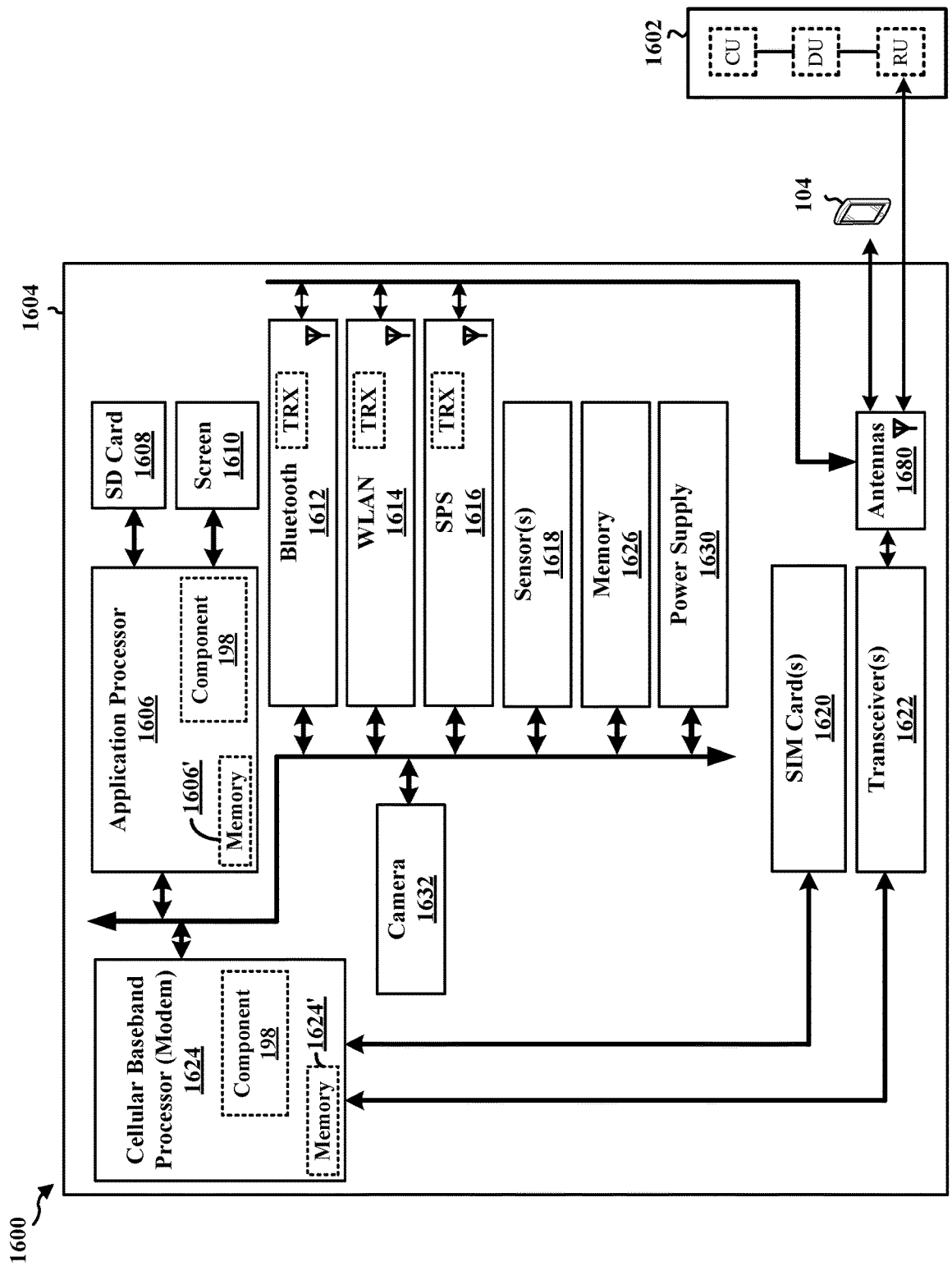
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 350 of FIG. 3) and include the additional modules of the apparatus 1604.

As discussed supra, the component 198 may be configured to communicate, with a network entity, information indicative of a guard interval length, where the information indicative of the guard interval length is based on transmission information; and communicate, with the network entity, a transmission including one or more symbols, where each symbol of the one or more symbols includes a particular guard interval based on the information indicative of the guard interval length. The component 198 may be further configured to perform any of the aspects described in connection with the flowcharts in FIG. 13 and FIG. 14, and/or performed by the UE 1202 in FIG. 12. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for communicating, with a network entity, information indicative of a guard interval length, where the information indicative of the guard interval length is based on transmission information, and means for communicating, with the network entity, a transmission including one or more symbols, where each symbol of the one or more symbols includes a particular guard interval based on the information indicative of the guard interval length. The apparatus 1604 may further include means for performing any of the aspects described in connection with the flowcharts in FIG. 13 and FIG. 14, and/or aspects performed by the UE 1202 in FIG. 12. The means may be the component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
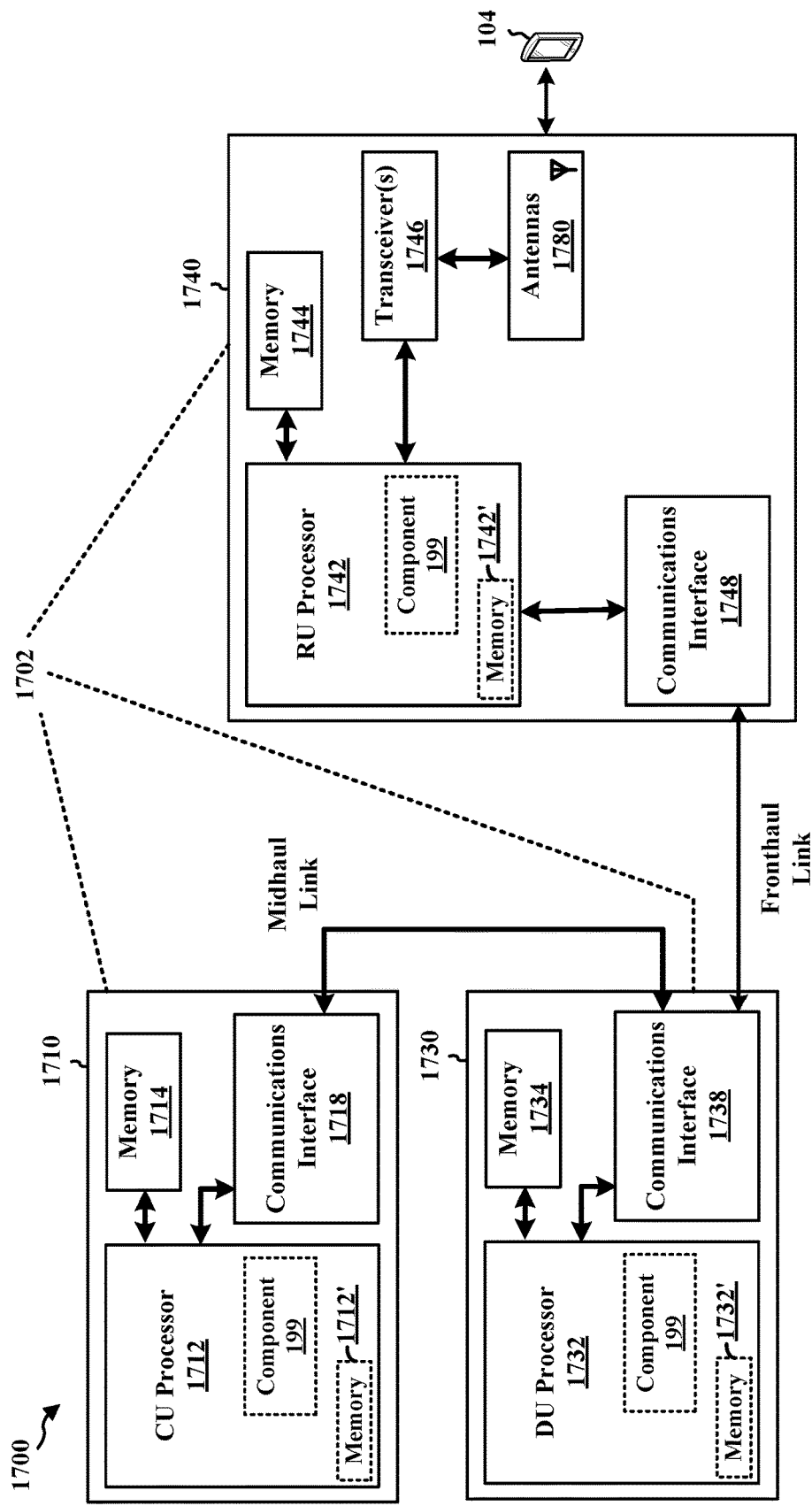
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to communicate, with a UE, information indicative of a guard interval length, where the information indicative of the guard interval length is based on transmission information; and communicate, with the UE, a transmission including one or more symbols, where each symbol of the one or more symbols includes a particular guard interval based on the information indicative of the guard interval length. The component 199 may be further configured to perform any of the aspects described in connection with the flowchart in FIG. 15, and/or performed by network entity 1204 in FIG. 12. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 includes means for communicating, with a UE, information indicative of a guard interval length, where the information indicative of the guard interval length is based on transmission information, and means for communicating, with the UE, a transmission including one or more symbols, where each symbol of the one or more symbols includes a particular guard interval based on the information indicative of the guard interval length. The network entity 1702 may further include means for performing any of the aspects described in connection with the flowchart in FIG. 15, and/or aspects performed by network entity 1204 in FIG. 12. The means may be the component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include communicating, with a network entity, information indicative of a guard interval length, where the information indicative of the guard interval length is based on transmission information; and communicating, with the network entity, a transmission including one or more symbols, where each symbol of the one or more symbols includes a particular guard interval based on the information indicative of the guard interval length. The method enables the GI length to be flexibly configured depending on various waveforms or channel parameters and characteristics of the transmission. The method enables transmission resources to be fully utilized according to actual operating conditions. Thus, it improves the efficiency and flexibility of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network entity. The method may include communicating, with a second network entity, information indicative of a guard interval length, where the information indicative of the guard interval length is based on transmission information; and communicating, with the second network entity, a transmission including one or more symbols, where each symbol of the one or more symbols includes a particular guard interval based on the information indicative of the guard interval length.

Aspect 2 is the method of aspect 1, where the transmission information may include information indicative of: at least one channel delay spread; the frequency range associated with the transmission; the network entity type associated with at least one of the first network entity or the second network entity; the transmission type associated with the transmission; the beam switch associated with the transmission; the MCS associated with the transmission; the coding rate associated with the transmission; the recipient associated with the transmission; the usage type associated with the transmission; or the subcarrier spacing associated with the transmission.

Aspect 3 is the method of any of aspects 1 to 2, where the information indicative of the guard interval length may be information indicative of the length of the particular guard interval, and the length of the particular guard interval may be based on at least one of the transmission information or measurement information.

Aspect 4 is the method of aspect 3, where the measurement information may include the BLER, the SNR, the quality metric, the SINR, the EVM, or the throughput, and the method may further include: receiving, from the second network entity, at least one training symbol respectively associated with at least one MCS, where each training symbol of the at least one training symbol may include a respective test guard interval; determining measurement information associated with each training symbol of the at least one training symbol; and transmitting, to the second network entity, information indicative of a particular test length associated with the at least one training symbol.

Aspect 5 is the method of aspect 3, where the measurement information may include the BLER, the SNR, the quality metric, the SINR, the EVM, or the throughput, and the method may further include: receiving, from the second network entity, at least one training symbol respectively associated with at least one MCS, where each training symbol of the at least one training symbol may include a respective test guard interval; determining measurement information associated with each training symbol of the at least one training symbol; and transmitting, to the second network entity, information indicative of the measurement information associated with the at least one training symbol.

Aspect 6 is the method of aspect 3, where the method may further include receiving, from the second network entity, a request for information indicative of at least one candidate length associated with an MCS and the transmission; and transmitting, to the second network entity, the information indicative of the at least one candidate length. The length of the particular guard interval may be equal to one of the at least one candidate length or an override length.

Aspect 7 is the method of aspect 6, where the method may further include determining the at least one candidate length based on a capability to mitigate inter-symbol interference associated with the first network entity for at least one communication with the candidate length.

Aspect 8 is the method of aspect 6, where the method may further include receiving, from the second network entity, information indicative of the override length. The length of the particular guard interval may be equal to the override length.

Aspect 9 is the method of aspect 6, where communicating the information indicative of the guard interval length may include transmitting, to the second network entity, information indicative of the guard interval length, information indicative of the at least one candidate length, and information indicative of at least one quality metric associated with the at least one candidate length.

Aspect 10 is the method of aspect 3, where the method may further include receiving, from the second network entity, information indicative of a candidate length for the length of the particular guard interval associated with the candidate length; and transmitting, to the second network entity, a scale factor. The length of the particular guard interval may be equal to the candidate length multiplied by the scale factor.

Aspect 11 is the method of aspect 1, where the information indicative of the guard interval length may be information indicative of at least one candidate length of the particular guard interval from a set of possible lengths, where the at least one candidate length may be based on an MCS associated with the transmission, and the method may further include: determining a length of the particular guard interval based on the at least one candidate length of the particular guard interval.

Aspect 12 is the method of aspect 1, where the information indicative of the guard interval length may be information indicative of a length of the particular guard interval from a set of possible lengths.

Aspect 13 is the method of aspect 1, where the method may further include receiving at least one RS; and determining at least one channel delay spread based on the at least one RS. The transmission information may include information indicative of the at least one channel delay spread, and each channel delay spread of the at least one channel delay spread may be associated with a respective TCI state.

Aspect 14 is the method of aspect 13, where determining the at least one channel delay spread may include measuring the at least one RS.

Aspect 15 is the method of aspect 13, where communicating the information indicative of the guard interval length may include transmitting the information indicative of the guard interval length to the second network entity, and communicating the transmission may include receiving, from the second network entity, the transmission.

Aspect 16 is the method of aspect 1, where the method may further include transmitting at least one RS.

Aspect 17 is the method of aspect 16, where communicating the information indicative of the guard interval length may include receiving the information indicative of the guard interval length from the second network entity, and communicating the transmission may include transmitting, to the second network entity, the transmission.

Aspect 18 is the method of aspect 1, where the information indicative of the guard interval length is information indicative of a maximum guard interval length, and where a length of the particular guard interval is based on the information indicative of the maximum guard interval length and based on at least one of: the transmission information or measurement information.

Aspect 19 is the method of aspect 18, where the measurement information may include the BLER, the SNR, the quality metric, the SINR, the EVM, or the throughput, and the method may further include receiving, from the second network entity, at least one training symbol respectively associated with at least one modulation and coding scheme (MCS), where each training symbol of the at least one training symbol may include a respective test guard interval having a respective test length less than the maximum guard interval length; determining measurement information associated with each training symbol of the at least one training symbol; and transmitting, to the second network entity, information indicative of a particular test length associated with the at least one training symbol.

Aspect 20 is the method of aspect 18, where the measurement information may include the BLER, the SNR, the quality metric, the SINR, the EVM, or the throughput, and the method may further include receiving, from the second network entity, at least one training symbol respectively associated with at least one MCS, where each training symbol of the at least one training symbol may include a respective test guard interval having a respective test length less than the maximum guard interval length; determining measurement information associated with each training symbol of the at least one training symbol; and transmitting, to the second network entity, information indicative of the measurement information associated with the at least one training symbol.

Aspect 21 is the method of aspect 18, where the length of the guard interval may be based on at least one of: the frequency range associated with the transmission; the network entity type associated with at least one of the first network entity or the second network entity; the transmission type associated with the transmission; the beam switch associated with the transmission; the MCS associated with the transmission; the coding rate associated with the transmission; the recipient associated with the transmission; the usage type associated with the transmission; or the subcarrier spacing associated with the transmission.

Aspect 22 is the method of aspect 1, where the method may further include transmitting, to the second network entity, information indicative of the length of the guard interval. The transmission may be associated with a reference signal.

Aspect 23 is the method of aspect 1, where the TB size associated with the transmission may be based on a length of the particular guard interval.

Aspect 24 is the method of aspect 1, where the TB size associated with the transmission may not be based on the length of the particular guard interval, and the coding rate associated with the transmission may be based on the length of the particular guard interval.

Aspect 25 is the method of aspect 1, where information indicative of the guard length may be based on at least one channel delay spread that satisfies a threshold based on the transmission information.

Aspect 26 is the method of aspect 1, where the particular guard interval may be present in each symbol of the one or more symbols at the start of the symbol, at the end of the symbol, or split between the start of the symbol or the end of the symbol.

Aspect 27 is the method of aspect 1, where the information indicative of the guard interval length may be information indicative of: the maximum guard interval length, the minimum guard interval length, the guard interval length range, or the length of the particular guard interval.

Aspect 28 is an apparatus for wireless communication at a UE, including: a memory; and at least one processor coupled to the memory and, based at least in part on information stored in the memory, the at least one processor is configured to perform the method of any of aspects 1-27.

Aspect 29 is the apparatus of aspect 28, further including at least one of a transceiver or an antenna coupled to the at least one processor and configured to communicate the information indicative of the guard interval length with the second network entity.

Aspect 30 is an apparatus for wireless communication including means for implementing the method of any of aspects 1-27.

Aspect 31 is a computer-readable medium (e.g., a non-transitory computer-readable medium) having code stored thereon that, when executed by an apparatus, causes the apparatus to perform the method of any of aspects 1-27.

What is claimed is:

1. A first network entity for wireless communication, comprising:
   a memory; and
   at least one processor coupled to the memory, wherein the at least one processor is configured to:
   communicate, with a second network entity, information indicative of a guard interval length, wherein the information indicative of the guard interval length is based on transmission information;
   communicate, with the second network entity, a transmission comprising one or more symbols, wherein each symbol of the one or more symbols includes a particular guard interval based on the information indicative of the guard interval length;
   receive, from the second network entity, at least one training symbol respectively associated with at least one modulation and coding scheme (MCS), wherein each training symbol of the at least one training symbol includes a respective test guard interval corresponding to a configured candidate guard interval length; and
   transmit, to the second network entity, information associated with one or more measurements of each training symbol or configured candidate guard interval length.

2. The first network entity of claim 1, wherein the transmission information includes information indicative of at least one of:
   at least one channel delay spread;
   a frequency range associated with the transmission;
   a network entity type associated with at least one of the first network entity or the second network entity;
   a transmission type associated with the transmission;
   a beam switch associated with the transmission;
   a modulation and coding scheme (MCS) associated with the transmission;
   a coding rate associated with the transmission;
   a recipient associated with the transmission;
   a usage type associated with the transmission; or
   a subcarrier spacing associated with the transmission.

3. The first network entity of claim 1, wherein the information indicative of the guard interval length is information indicative of a length of the particular guard interval, and wherein the length of the particular guard interval is based on: the transmission information, or the transmission information and measurement information.

4. The first network entity of claim 3, wherein the measurement information comprises a block error rate (BLER), a signal to noise ratio (SNR), a quality metric, a signal-to-interference and noise ratio (SINR), an error vector magnitude (EVM), or a throughput, and wherein the at least one processor is configured to:
   receive, from the second network entity, at least one training symbol respectively associated with at least one modulation and coding scheme (MCS), wherein each training symbol of the at least one training symbol comprises a respective test guard interval;
   determine the measurement information associated with each training symbol of the at least one training symbol; and
   transmit, to the second network entity, information indicative of a particular test length associated with the at least one training symbol.

5. The first network entity of claim 3, wherein the measurement information comprises a block error rate (BLER), a signal-to-noise ratio (SNR), a quality metric, a signal-to-interference and Noise Ratio (SINR), an error vector magnitude (EVM), or a throughput, and wherein the at least one processor is configured to:
receive, from the second network entity, at least one training symbol respectively associated with at least one modulation and coding scheme (MCS), wherein each training symbol of the at least one training symbol comprises a respective test guard interval;
determine the measurement information associated with each training symbol of the at least one training symbol; and
transmit, to the second network entity, information indicative of the measurement information associated with the at least one training symbol.

6. The first network entity of claim 3, wherein the at least one processor is configured to:
receive, from the second network entity, a request for information indicative of at least one candidate length associated with a modulation and coding scheme (MCS) and the transmission; and
transmit, to the second network entity, the information indicative of the at least one candidate length, wherein the length of the particular guard interval is equal to one of the at least one candidate length or an override length.

7. The first network entity of claim 6, wherein the at least one processor is configured to:
determine the at least one candidate length based on a capability to mitigate inter-symbol interference associated with the first network entity for at least one communication with the at least one candidate length.

8. The first network entity of claim 6, wherein the at least one processor is configured to:
receive, from the second network entity, information indicative of the override length, wherein the length of the particular guard interval is equal to the override length.

9. The first network entity of claim 6, wherein to communicate the information indicative of the guard interval length, the at least one processor is configured to:
transmit, to the second network entity, information indicative of the guard interval length, information indicative of the at least one candidate length, and information indicative of at least one quality metric associated with the at least one candidate length.

10. The first network entity of claim 3, wherein the at least one processor is configured to:
receive, from the second network entity, information indicative of a candidate length for the length of the particular guard interval associated with the candidate length; and
transmit, to the second network entity, a scale factor, wherein the length of the particular guard interval is equal to the candidate length multiplied by the scale factor.

11. The first network entity of claim 1, wherein the information indicative of the guard interval length is information indicative of at least one candidate length of the particular guard interval from a set of possible lengths, wherein the at least one candidate length is based on a modulation and coding scheme (MCS) associated with the transmission, and wherein the at least one processor is configured to:
determine a length of the particular guard interval based on the at least one candidate length of the particular guard interval.

12. The first network entity of claim 1, wherein the information indicative of the guard interval length is information indicative of a length of the particular guard interval from a set of possible lengths.

13. The first network entity of claim 1, wherein the at least one processor is configured to:
receive at least one reference signal (RS); and
determine at least one channel delay spread based on the at least one RS, wherein the transmission information includes information indicative of the at least one channel delay spread, wherein each channel delay spread of the at least one channel delay spread is associated with a respective transmission configuration indicator (TCI) state.

14. The first network entity of claim 13, wherein, to determine the at least one channel delay spread, the at least one processor is configured to measure the at least one RS.

15. The first network entity of claim 13, wherein to communicate the information indicative of the guard interval length, the at least one processor is configured to transmit the information indicative of the guard interval length to the second network entity, and wherein to communicate the transmission, the at least one processor is configured to receive, from the second network entity, the transmission.

16. The first network entity of claim 1, wherein the at least one processor is configured to:
transmit at least one reference signal (RS).

17. The first network entity of claim 16, wherein:
to communicate the information indicative of the guard interval length, the at least one processor is configured to receive the information indicative of the guard interval length from the second network entity, and
to communicate the transmission, the at least one processor is configured to transmit, to the second network entity, the transmission.

18. The first network entity of claim 1, wherein the information indicative of the guard interval length is information indicative of a maximum guard interval length, and wherein a length of the particular guard interval is based on the information indicative of the maximum guard interval length and based on: the transmission information, or the transmission information and measurement information.

19. The first network entity of claim 18, wherein the measurement information comprises a block error rate (BLER), a signal-to-noise ratio (SNR), a quality metric, a signal-to-interference and noise ratio (SINR), an error vector magnitude (EVM), or a throughput, and wherein the at least one processor is configured to:
receive, from the second network entity, at least one training symbol respectively associated with at least one modulation and coding scheme (MCS), wherein each training symbol of the at least one training symbol comprises a respective test guard interval having a respective test length less than the maximum guard interval length;
determine the measurement information associated with each training symbol of the at least one training symbol; and
transmit, to the second network entity, information indicative of a particular test length associated with the at least one training symbol.

20. The first network entity of claim 18, wherein the measurement information comprises a block error rate (BLER), a signal to noise ratio (SNR), a quality metric, a signal-to-interference and noise ratio (SINR), an error vector magnitude (EVM), or a throughput, and wherein the at least one processor is configured to:
- receive, from the second network entity, at least one training symbol respectively associated with at least one modulation and coding scheme (MCS), wherein each training symbol of the at least one training symbol comprises a respective test guard interval having a respective test length less than the maximum guard interval length;
- determine the measurement information associated with each training symbol of the at least one training symbol; and
- transmit, to the second network entity, information indicative of the measurement information associated with the at least one training symbol.

21. The first network entity of claim 18, wherein the length of the particular guard interval is based on at least one of:
- a frequency range associated with the transmission;
- a network entity type associated with at least one of the first network entity or the second network entity;
- a transmission type associated with the transmission;
- a beam switch associated with the transmission;
- a modulation and coding scheme (MCS) associated with the transmission;
- a coding rate associated with the transmission;
- a recipient associated with the transmission;
- a usage type associated with the transmission; or
- a subcarrier spacing associated with the transmission.

22. The first network entity of claim 1, wherein the at least one processor is configured to:
- transmit, to the second network entity and based on a reference signal, information indicative of the guard interval length.

23. The first network entity of claim 1, wherein a transport block (TB) size associated with the transmission is based on a length of the particular guard interval.

24. The first network entity of claim 1, wherein a transport block (TB) size associated with the transmission is not based on a length of the particular guard interval, and wherein a coding rate associated with the transmission is based on the length of the particular guard interval.

25. The first network entity of claim 1, wherein information indicative of the guard interval length is based on at least one channel delay spread that satisfies a threshold based on the transmission information.

26. The first network entity of claim 1, wherein the particular guard interval is present in each symbol of the one or more symbols at a start of each symbol, at an end of each symbol, or split between the start of each symbol or the end of each symbol.

27. The first network entity of claim 1, wherein the information indicative of the guard interval length is information indicative of: a maximum guard interval length, a minimum guard interval length, a guard interval length range, or a length of the particular guard interval.

28. A method for wireless communication performed by a first network entity, comprising:
- communicating, with a second network entity, information indicative of a guard interval length, wherein the information indicative of the guard interval length is based on transmission information;
- communicating, with the second network entity, a transmission comprising one or more symbols, wherein each symbol of the one or more symbols includes a particular guard interval based on the information indicative of the guard interval length;
- receiving, from the second network entity, at least one training symbol respectively associated with at least one modulation and coding scheme (MCS), wherein each training symbol of the at least one training symbol includes a respective test guard interval corresponding to a configured candidate guard interval length; and
- transmitting, to the second network entity, information associated with one or more measurements of each training symbol or configured candidate guard interval length.

29. A first network entity for wireless communication, comprising:
- means for communicating, with a second network entity, information indicative of a guard interval length, wherein the information indicative of the guard interval length is based on transmission information;
- means for communicating, with the second network entity, a transmission comprising one or more symbols, wherein each symbol of the one or more symbols includes a particular guard interval based on the information indicative of the guard interval length;
- means for receiving, from the second network entity, at least one training symbol respectively associated with at least one modulation and coding scheme (MCS), wherein each training symbol of the at least one training symbol includes a respective test guard interval corresponding to a configured candidate guard interval length; and
- means for transmitting, to the second network entity, information associated with one or more measurements of each training symbol or configured candidate guard interval length.

30. A non-transitory computer-readable medium having code stored thereon that, when executed by an apparatus, causes the apparatus to perform operations, comprising:
- communicating, with a network entity, information indicative of a guard interval length, wherein the information indicative of the guard interval length is based on transmission information;
- communicating, with the network entity, a transmission comprising one or more symbols, wherein each symbol of the one or more symbols includes a particular guard interval based on the information indicative of the guard interval length;
- receiving, from the network entity, at least one training symbol respectively associated with at least one modulation and coding scheme (MCS), wherein each training symbol of the at least one training symbol includes a respective test guard interval corresponding to a configured candidate guard interval length; and
- transmitting, to the network entity, information associated with one or more measurements of each training symbol or configured candidate guard interval length.

* * * * *